(12) United States Patent
Livshits et al.

(10) Patent No.: US 8,871,090 B2
(45) Date of Patent: Oct. 28, 2014

(54) FOAMING OF LIQUIDS

(75) Inventors: David Livshits, San Francisco, CA (US);
Lester Teichner, Chicago, IL (US)

(73) Assignee: Turbulent Energy, LLC, Lexington, MA (US)

( * ) Notice: Subject to any disclaimer, the term of this patent is extended or adjusted under 35 U.S.C. 154(b) by 1166 days.

(21) Appl. No.: 12/679,884

(22) PCT Filed: Sep. 5, 2008

(86) PCT No.: PCT/US2008/075378
§ 371 (c)(1),
(2), (4) Date: Mar. 24, 2010

(87) PCT Pub. No.: WO2009/042372
PCT Pub. Date: Apr. 2, 2009

(65) Prior Publication Data
US 2010/0193445 A1     Aug. 5, 2010

Related U.S. Application Data

(60) Provisional application No. 60/974,948, filed on Sep. 25, 2007, provisional application No. 61/012,318, filed on Dec. 7, 2007, provisional application No. 61/012,326, filed on Dec. 7, 2007.

(51) Int. Cl.
| | | |
|---|---|---|
| C02F 1/24 | (2006.01) |
| B01F 3/04 | (2006.01) |
| B03D 1/14 | (2006.01) |
| B03D 1/24 | (2006.01) |
| B01F 3/08 | (2006.01) |
| B01F 15/00 | (2006.01) |
| B08B 3/10 | (2006.01) |
| B03D 1/02 | (2006.01) |

(52) U.S. Cl.
CPC . *B03D 1/24* (2013.01); *B03D 1/242* (2013.01); *C02F 1/24* (2013.01); *B01F 3/0865* (2013.01); *B01F 15/00207* (2013.01); *B08B 3/102* (2013.01); *B03D 1/1412* (2013.01); *B03D 1/028* (2013.01); *B03D 1/1462* (2013.01); *B03D 1/1493* (2013.01)
USPC ..................................... 210/221.2; 261/123

(58) Field of Classification Search
CPC ................................. C02F 1/24; B03D 1/242
USPC ..................................... 210/221.2; 261/123
See application file for complete search history.

(56) References Cited

U.S. PATENT DOCUMENTS

| | | | |
|---|---|---|---|
| 2,295,740 A | 9/1942 | Keen | |
| 3,645,892 A * | 2/1972 | Schulman | ..................... 210/706 |

(Continued)

FOREIGN PATENT DOCUMENTS

| | | |
|---|---|---|
| DE | 3723618 | 12/1988 |
| DE | 4211031 | 10/1993 |

(Continued)

OTHER PUBLICATIONS

International Search Report and Written Opinion for PCT/US2008/075366, Nov. 2008.

(Continued)

*Primary Examiner* — Thomas M Lithgow
(74) *Attorney, Agent, or Firm* — Vedder Price P.C.

(57) ABSTRACT

Methods and systems for processing of liquids using compressed gases or compressed air are disclosed. In addition, methods and systems for mixing of liquids are disclosed.

2 Claims, 35 Drawing Sheets

(56) References Cited

U.S. PATENT DOCUMENTS

| | | |
|---|---|---|
| 3,735,778 A | 5/1973 | Garnier |
| 3,980,233 A | 9/1976 | Simmons et al. |
| 4,215,081 A | 7/1980 | Brooks |
| 4,218,012 A | 8/1980 | Hamza et al. |
| 4,398,827 A | 8/1983 | Dietrich |
| 4,399,107 A | 8/1983 | Bose |
| 4,415,275 A | 11/1983 | Dietrich |
| 4,464,314 A | 8/1984 | Surovikin et al. |
| 4,553,504 A | 11/1985 | Duggal et al. |
| 4,812,049 A | 3/1989 | McCall |
| 4,917,152 A | 4/1990 | Decker |
| 4,954,147 A | 9/1990 | Gaigon |
| 5,174,247 A | 12/1992 | Tosa et al. |
| 5,176,448 A | 1/1993 | King et al. |
| 5,183,335 A | 2/1993 | Lang et al. |
| 5,193,341 A | 3/1993 | Sibbertsen et al. |
| 5,330,105 A | 7/1994 | Kaylor |
| 5,372,281 A | 12/1994 | Palmer et al. |
| 5,431,286 A * | 7/1995 | Xu et al. .............. 209/170 |
| 5,449,114 A | 9/1995 | Wells et al. |
| 5,452,955 A | 9/1995 | Lundstrom |
| 5,460,449 A | 10/1995 | Kent et al. |
| 5,492,404 A | 2/1996 | Smith |
| 5,492,409 A | 2/1996 | Karlsson et al. |
| 5,575,561 A | 11/1996 | Rohwer |
| 5,584,995 A * | 12/1996 | Meekel et al. ........... 210/221.2 |
| 5,657,631 A | 8/1997 | Androsov |
| 5,678,766 A | 10/1997 | Peck et al. |
| 5,820,256 A | 10/1998 | Morrison |
| 5,865,158 A | 2/1999 | Cleveland et al. |
| 5,918,465 A | 7/1999 | Schmid |
| 5,992,529 A | 11/1999 | Williams |
| 6,022,135 A | 2/2000 | Williams |
| 6,027,241 A | 2/2000 | King |
| 6,036,356 A | 3/2000 | Yang et al. |
| RE36,969 E | 11/2000 | Streiff et al. |
| 6,170,978 B1 | 1/2001 | Short |
| 6,367,262 B1 | 4/2002 | Mongia et al. |
| 6,422,735 B1 | 7/2002 | Lang |
| 6,432,148 B1 | 8/2002 | Ganan-Calvo |
| 6,534,023 B1 | 3/2003 | Liou |
| 6,669,843 B2 | 12/2003 | Arnaud |
| 6,974,542 B2 | 12/2005 | von Paul |
| 6,986,832 B2 | 1/2006 | Lamminen et al. |
| 7,018,435 B1 | 3/2006 | Wentinck |
| 7,041,144 B2 | 5/2006 | Kozyuk |
| 7,165,881 B2 | 1/2007 | Holl |
| 7,448,794 B2 | 11/2008 | Hansen |
| 2006/0150643 A1 | 7/2006 | Sullivan |
| 2007/0137590 A1 | 6/2007 | Vetrovec |
| 2007/0206435 A1 | 9/2007 | Lester et al. |
| 2008/0016968 A1 | 1/2008 | McCall et al. |
| 2008/0194868 A1 | 8/2008 | Kozyuk |

FOREIGN PATENT DOCUMENTS

| | | |
|---|---|---|
| DE | 29612769 | 12/1996 |
| DE | 10310442 | 9/2004 |
| EP | 0044498 | 1/1982 |
| GB | 2263649 | 8/1993 |
| GB | 2334901 | 9/1999 |
| JP | 56130213 | 10/1981 |
| JP | 62079835 | 4/1987 |
| JP | 5161899 | 6/1993 |
| JP | 8131800 | 5/1996 |
| JP | 2001000849 | 1/2001 |
| JP | 2006326498 | 12/2006 |
| KR | 20040040926 | 9/2004 |
| RU | 2133829 | 7/1999 |
| SU | 1662653 | 7/1991 |
| WO | 88/06493 | 9/1988 |
| WO | 93/07960 | 4/1993 |
| WO | 00/12202 | 3/2000 |
| WO | 2006/038810 | 4/2006 |
| WO | 2006/117435 | 11/2006 |
| WO | 2007/086897 | 8/2007 |
| WO | 2007/115810 | 10/2007 |
| WO | 2009/021148 | 2/2009 |
| WO | 2009/035334 | 3/2009 |

OTHER PUBLICATIONS

International Search Report and Written Opinion for PCT/US2008/075374, Mar. 2009.

International Search Report and Written Opinion for PCT/US2009/043547, Jul. 2009.

ISA/US, Commissioner for Patents, International Search Report of International Application No. PCT/US2008/075378, Nov. 18, 2008.

* cited by examiner

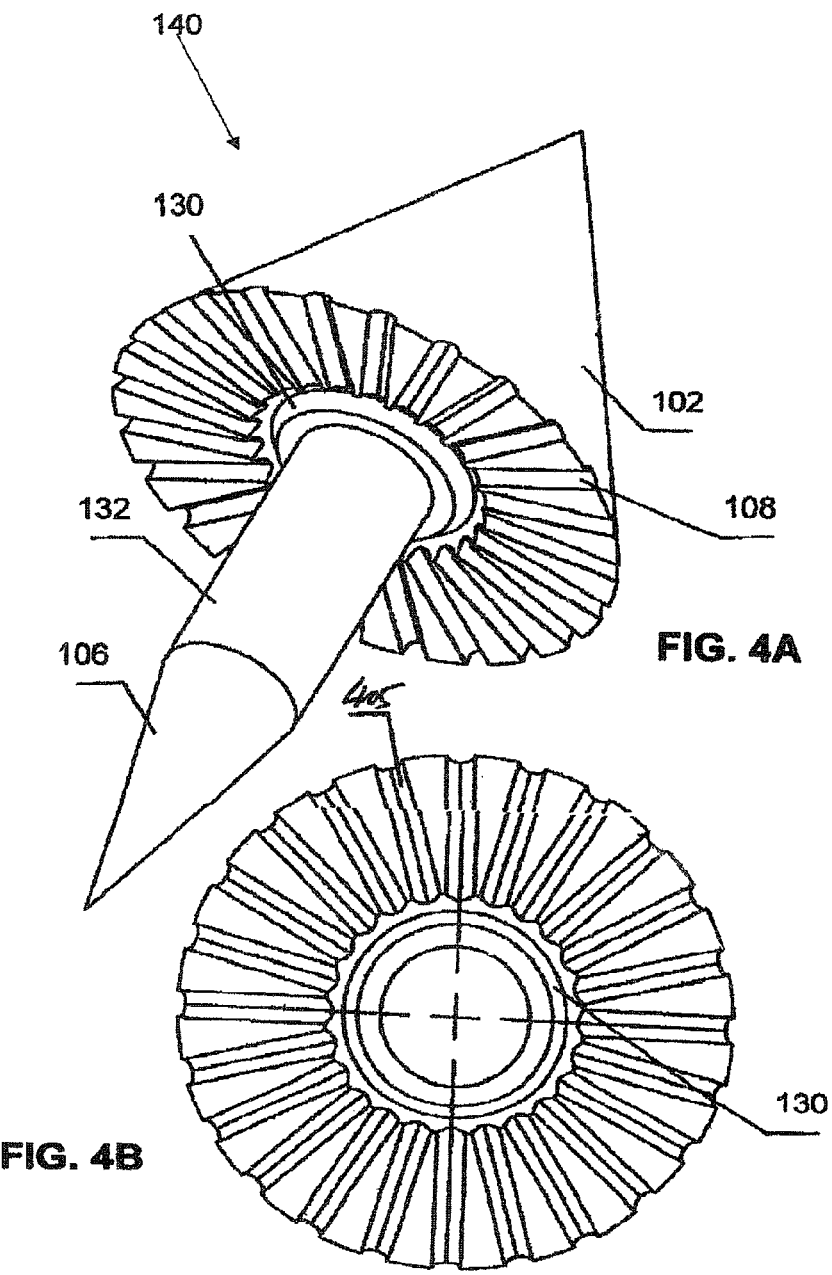

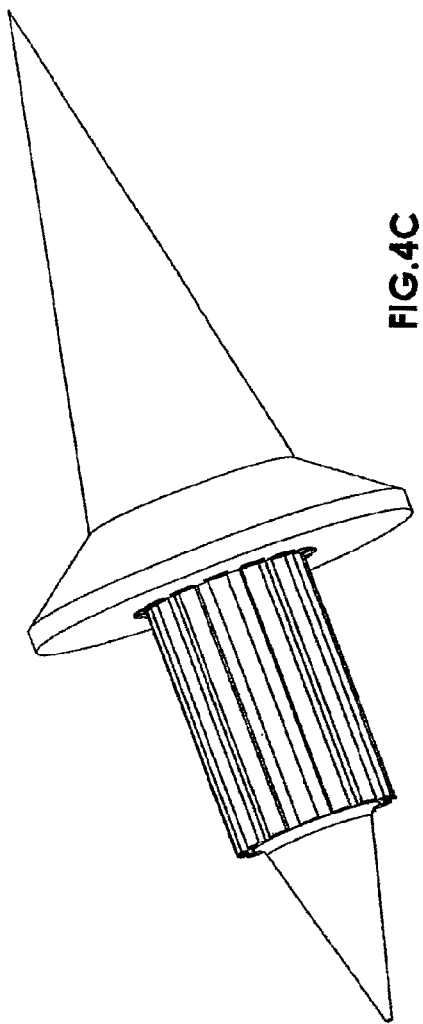
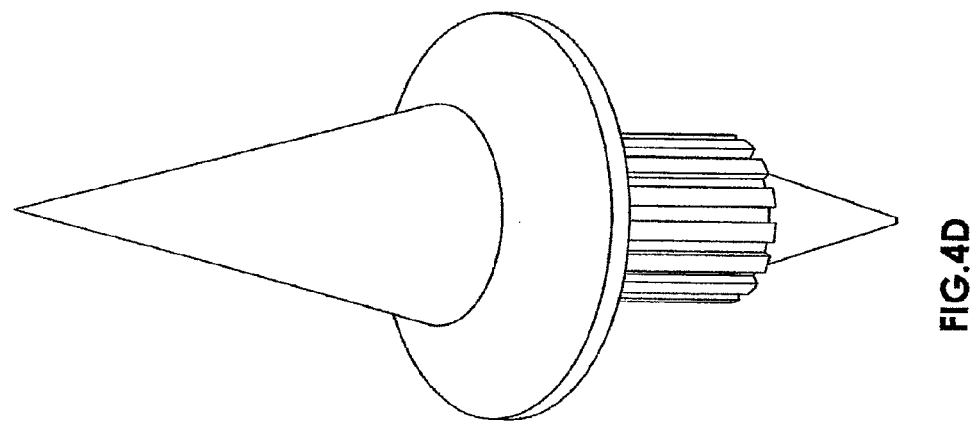
FIG.4C
FIG.4D

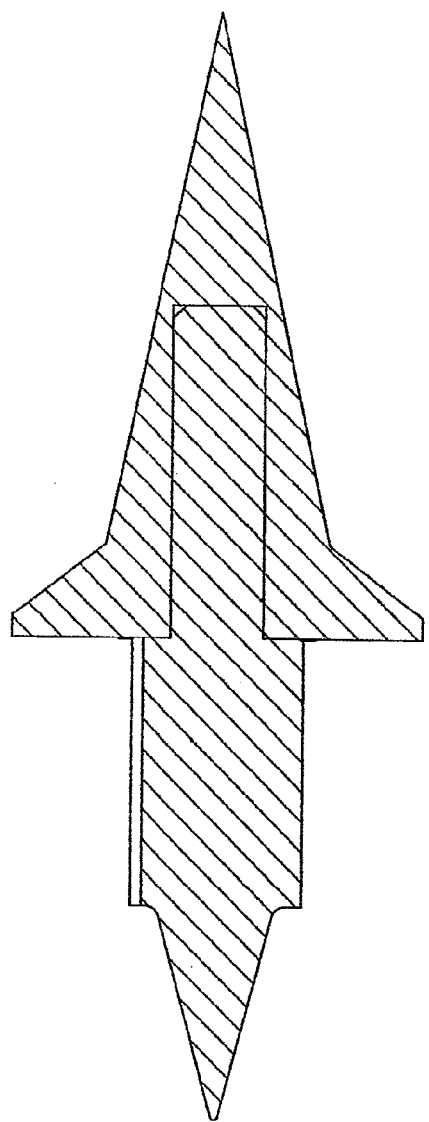
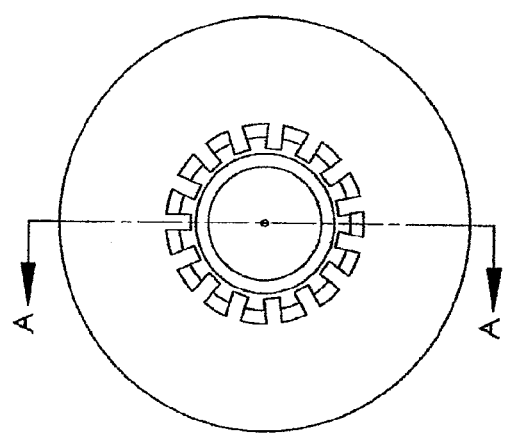
FIG.4F (SECTION A-A on FIG.4E)
FIG.4E

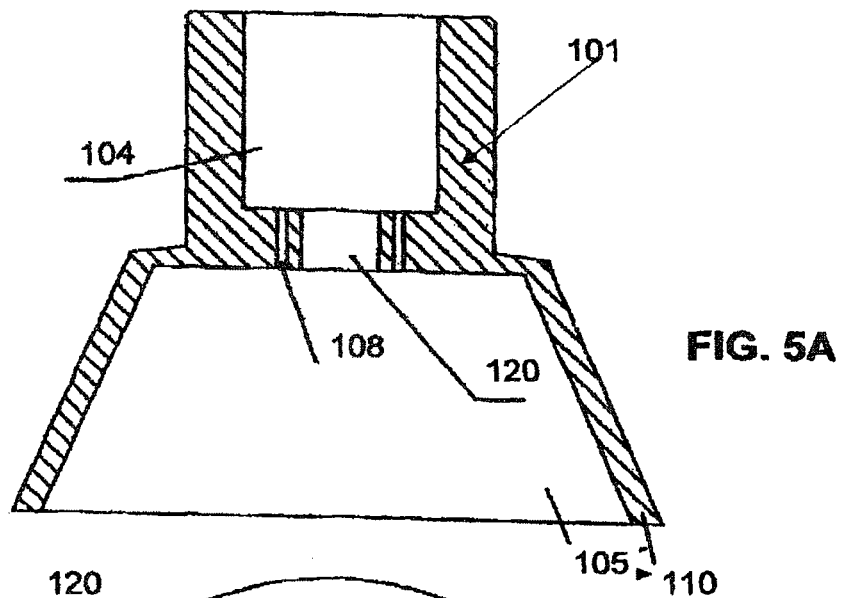
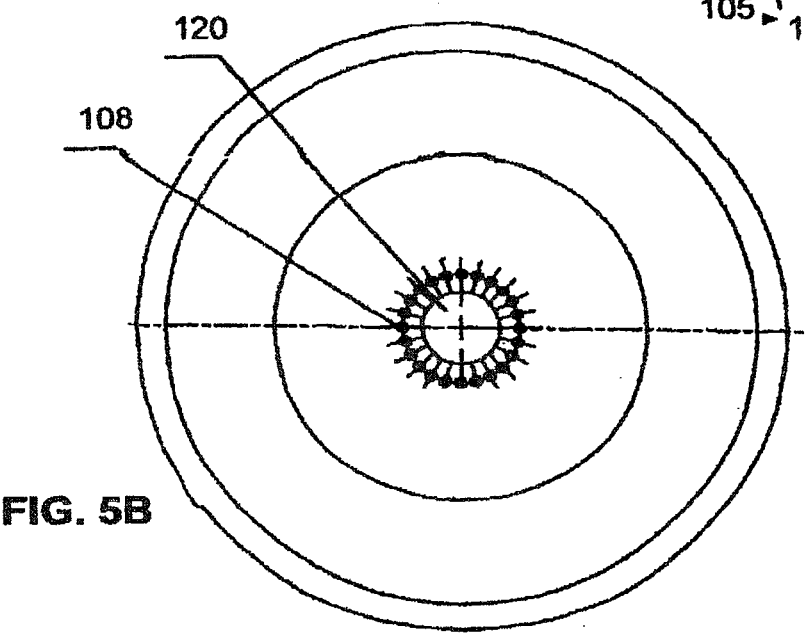
FIG. 5A
FIG. 5B

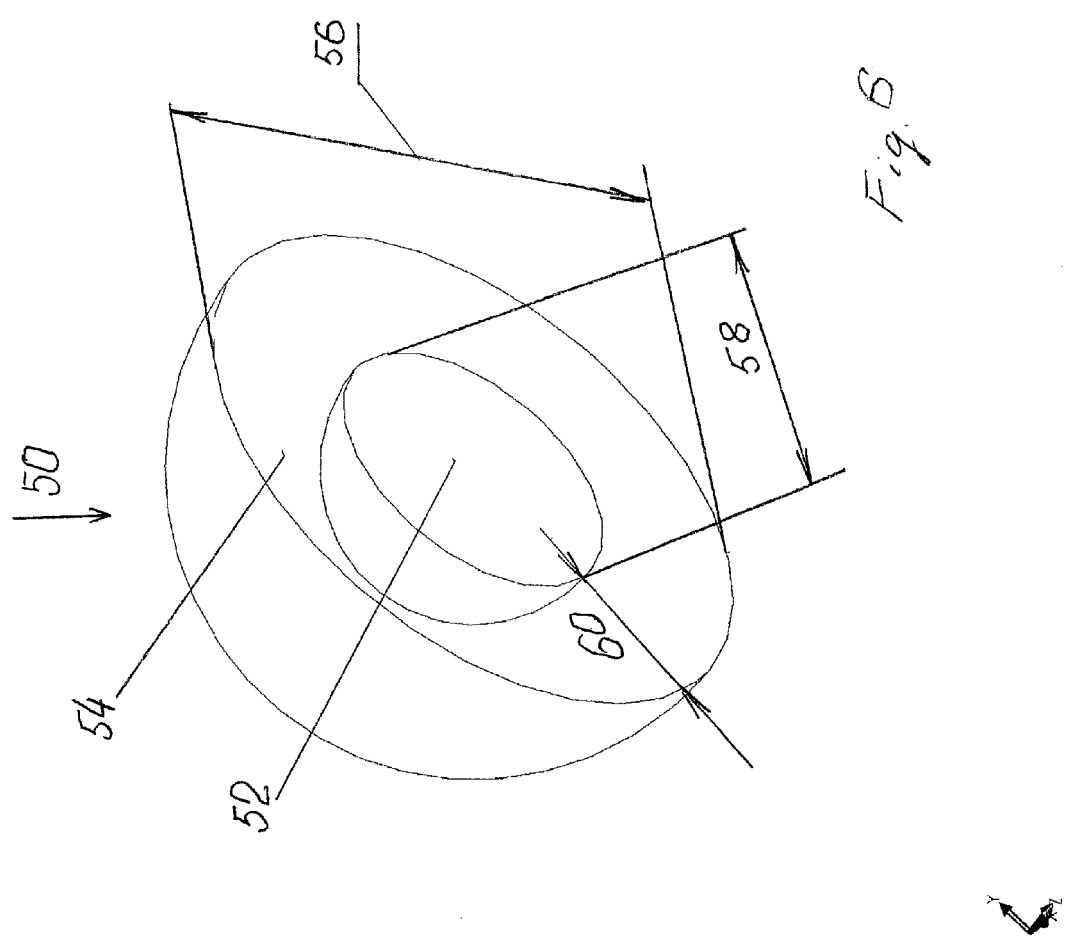

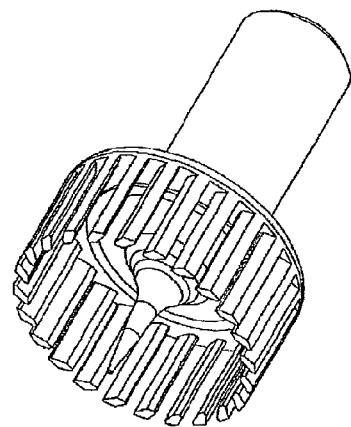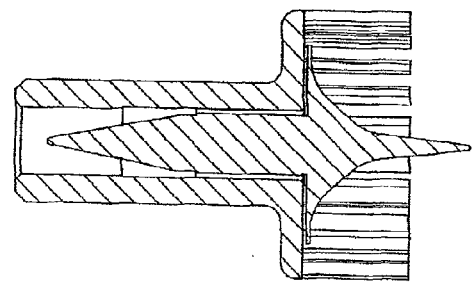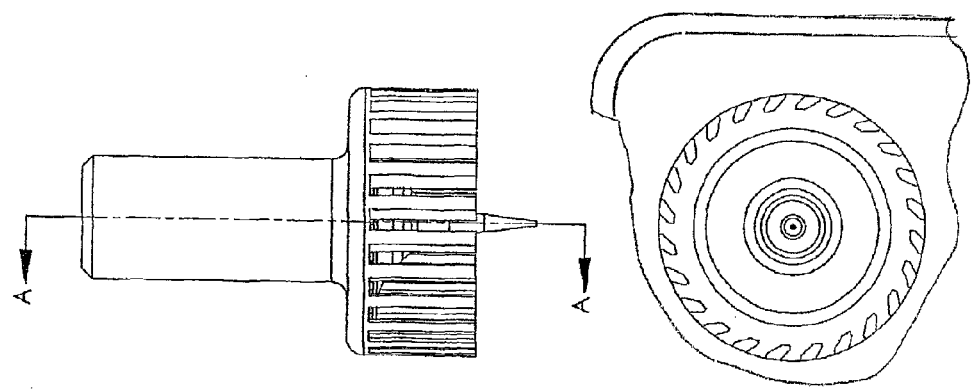
FIG. 15A
SECTION A-A

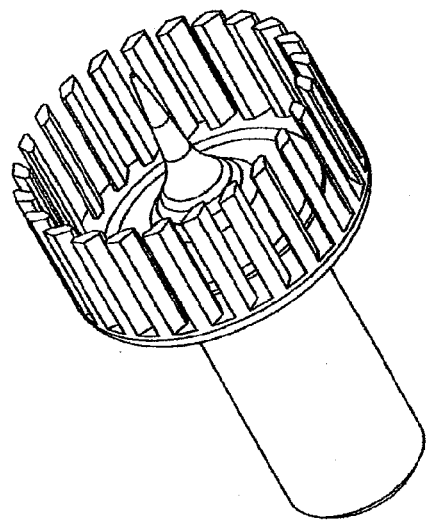
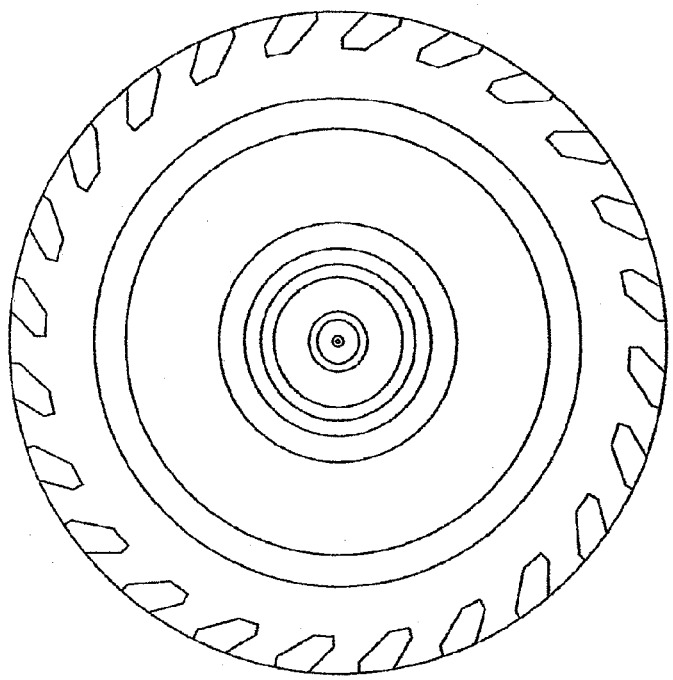
FIG. 15B

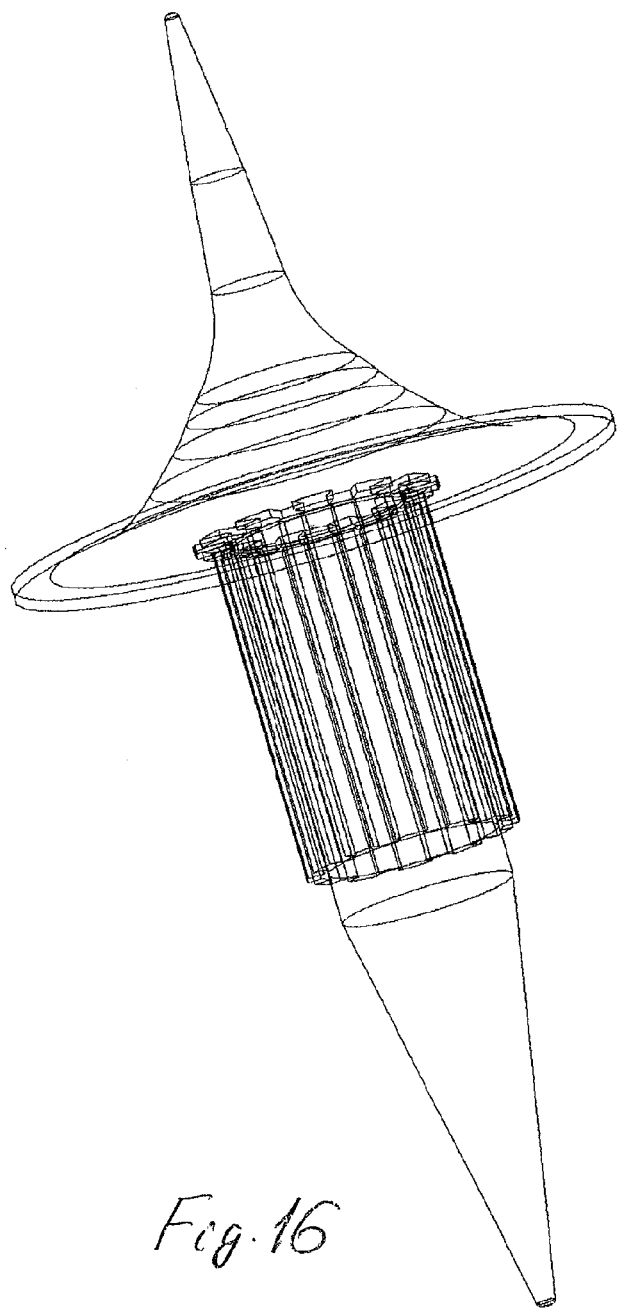
Fig. 16

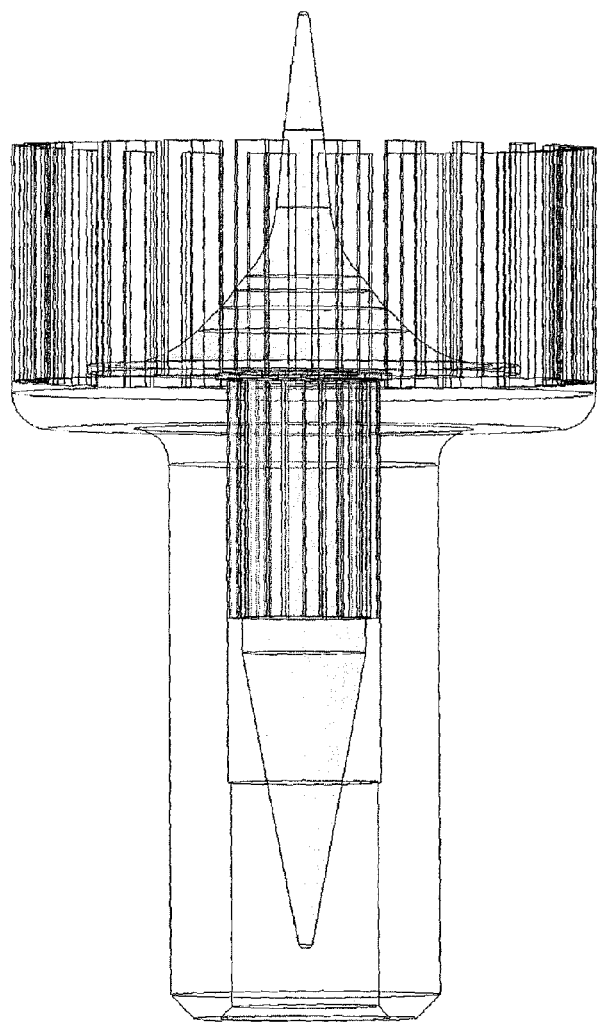
Fig. 17

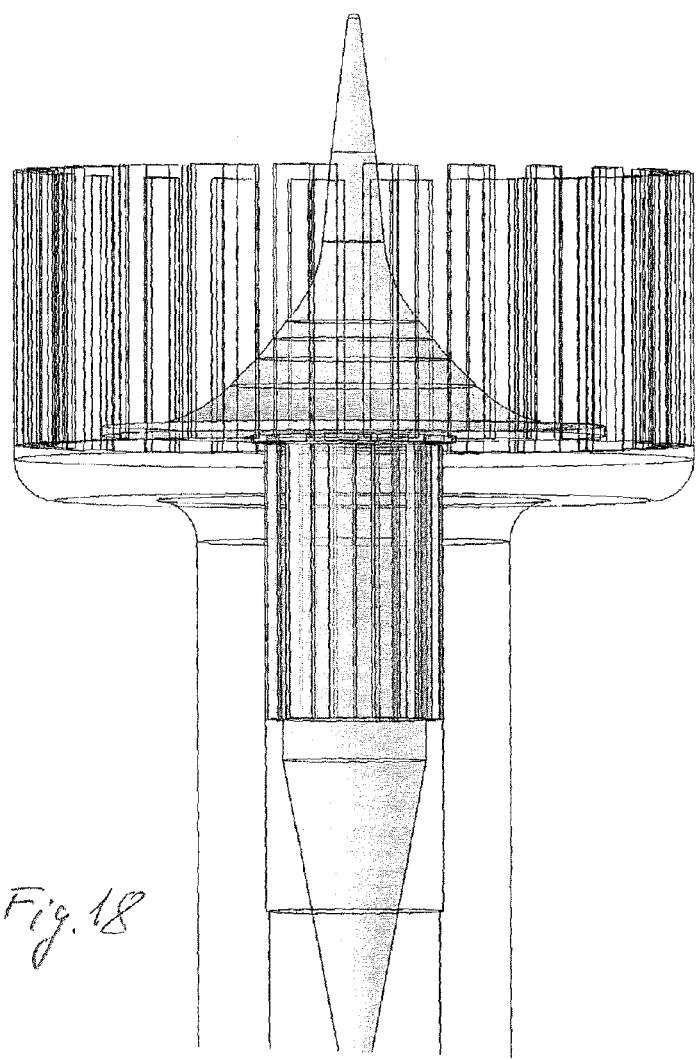
Fig. 18

$$S_2 = (S_1 \times h) \times (min.2).$$
$$S_3 = S_1 \times h.$$
$$S_4 = [S_2 + S_3 + (S_1 \times h)] \times min(\pi = 3,1417)$$

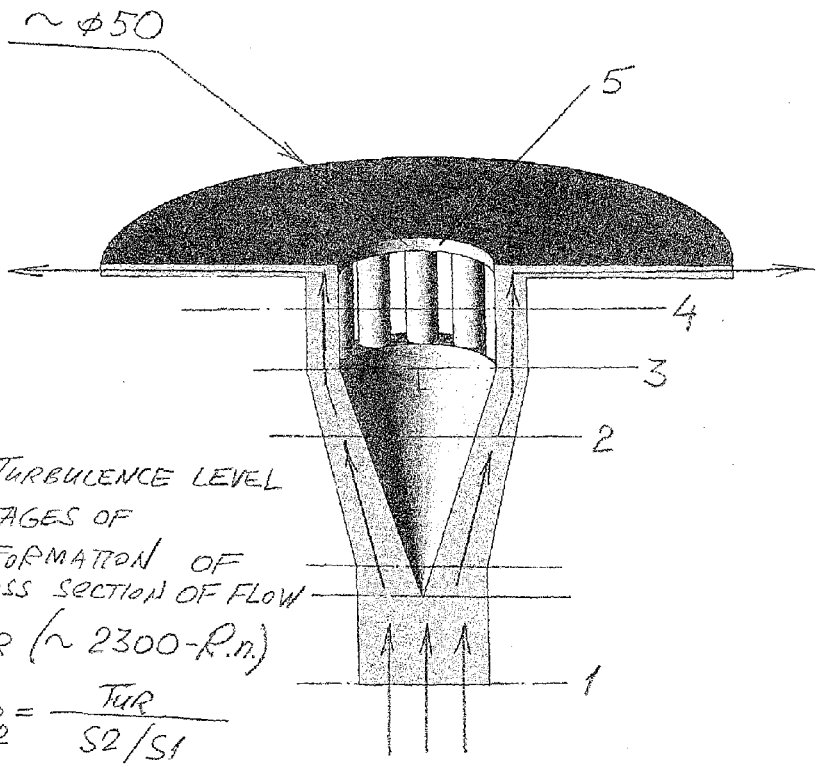
Fig. 26

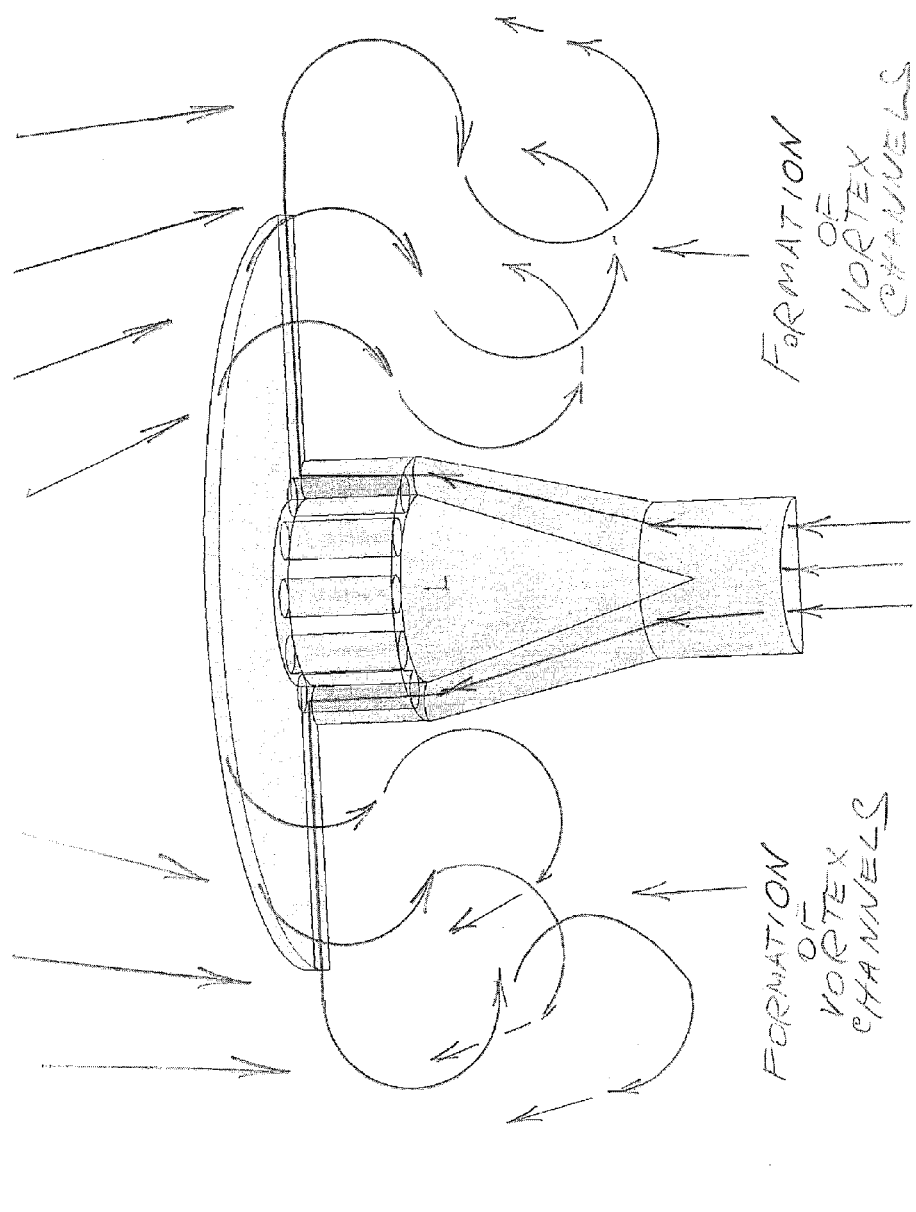

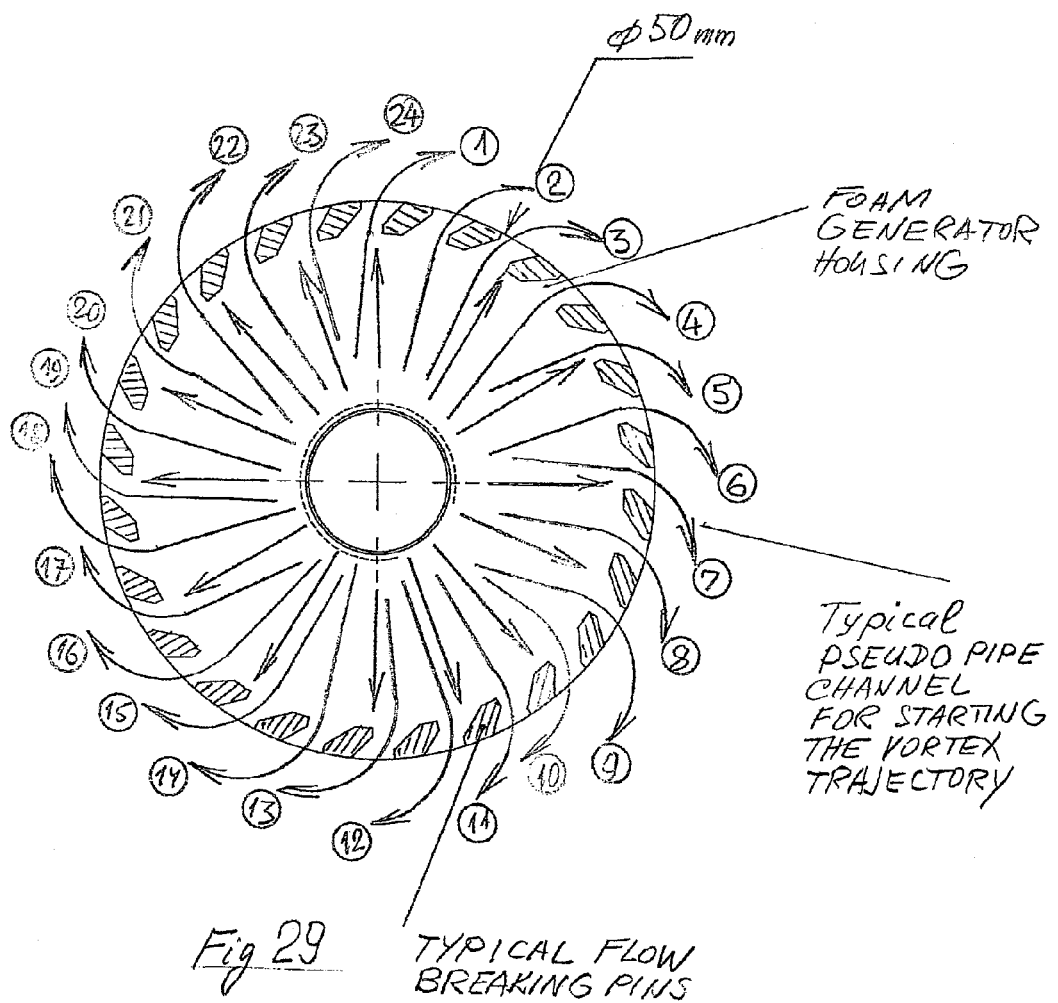

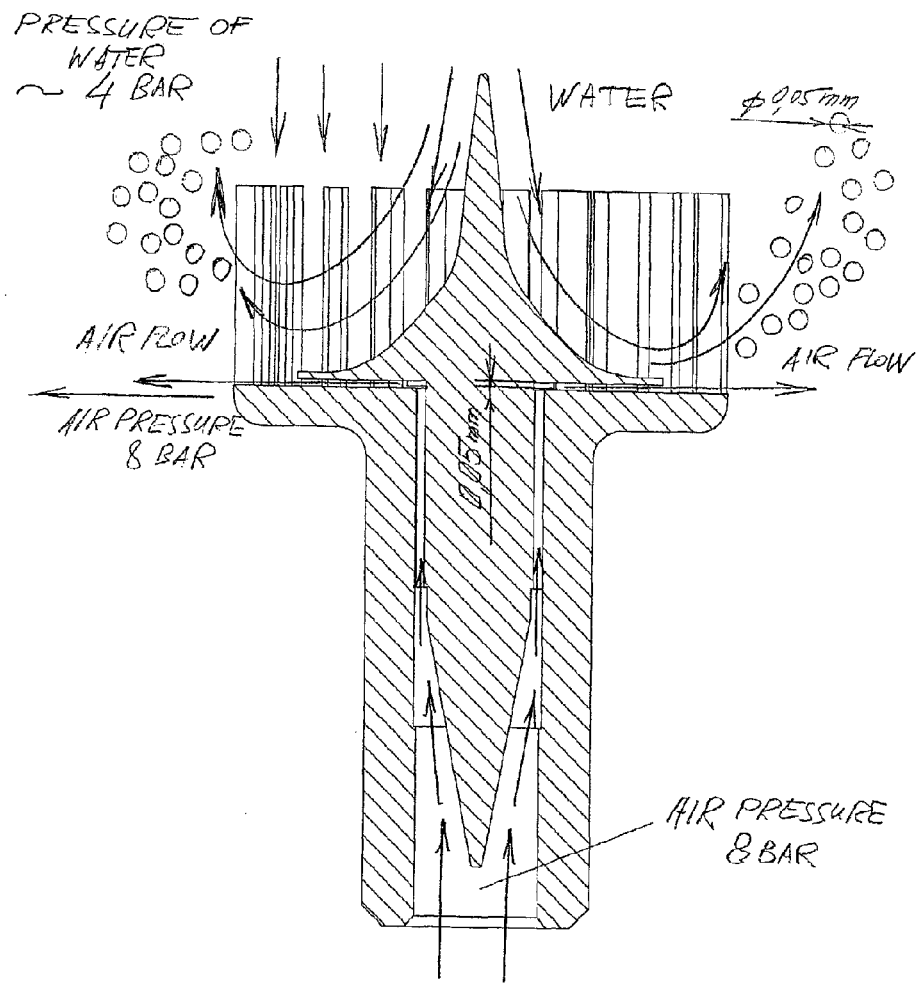

FOAMING OF LIQUIDS

CLAIMS OF PRIORITY

This application claims priority to U.S. Provisional Application No. 60/974,948, filed Sep. 25, 2007, and entitled "A DEVICE FOR FOAMING OF LIQUIDS"; U.S. Provisional Application No. 61/012,318, filed Dec. 7, 2007, and entitled "FOAMING OF LIQUIDS"; and U.S. Provisional Application No. 61/012,326, filed Dec. 7, 2007, and titled "FOAMING OF LIQUIDS", all of which are hereby incorporated by reference in their entirety.

TECHNICAL FIELD

Methods and systems for processing of liquids using compressed gases or compressed air are disclosed. In addition, methods and systems for mixing of liquids are disclosed. In addition, methods and systems for surface cleaning with active foam are disclosed.

BACKGROUND

Devices for transformation of a gaseous working agent are known, during which the speed of movement sharply increases and which in turn creates a local low pressure zone and which then uses an aerodynamic effect that thus arises; also, the process of creating a vacuum in this manner is also described in U.S. Pat. No. 5,871,814.

SUMMARY

In some aspects, a device for foaming of a liquid includes a source configured to provide an axial stream of a pressurized gaseous working agent. The device for foaming of a liquid also includes a mechanism having an aerodynamic component and an aerodynamic housing. The aerodynamic housing is disposed around at least a portion of the aerodynamic component and includes a plurality of first channels. The mechanism also includes a plurality of second channels connected to the plurality of first channels at regular intervals on a distributed plane, the distributed plane being about perpendicular to the plurality of first channels. The plurality of first and second channels are configured to transform the axial stream of the gaseous working agent into a plurality of radial high-speed streams of the gaseous working agent by channeling the gaseous working agent through the plurality of first and second channels on the distributed plane. The device also includes a hydrodynamic conical reflector and a hydrodynamic housing forming a ring channel in an area between the hydrodynamic conical reflector and the hydrodynamic housing. The device also includes an accumulation mechanism configured to disperse the plurality of radial high-speed streams of the gaseous working agent into the ring channel and create turbulence to foam the liquid.

In some embodiments, the accumulation mechanism is configured to create turbulence to foam the liquid utilizing at least the physical principles of Bernoulli's theorem.

In some aspects, a device for foaming of a liquid includes an aerodynamic mechanism including a system of channels for receiving a pressurized gaseous working agent and transforming the gaseous working agent into high-speed streams of the gaseous working agent. The device also includes a hydrodynamic mechanism including a hydrodynamic ring channel having a gradually increasing cross-sectional area, the hydrodynamic mechanism being configured to receive the streams of the gaseous working agent and generate a foam liquid in the hydrodynamic ring channel in a zone of connection of gaseous and liquid environments. The device also includes an aerodynamic and hydrodynamic interface within the device connecting the aerodynamic mechanism and the hydrodynamic mechanism. The aerodynamic and hydrodynamic interface includes an aerodynamic reflector, a hydrodynamic reflector, and a shaft connecting the aerodynamic and hydrodynamic reflectors.

In some embodiments, the liquid is a water solution that includes organic and inorganic components. In some embodiments, the aerodynamic mechanism and the hydrodynamic mechanism are configured to create turbulence to foam the liquid utilizing at least the physical principles of Bernoulli's theorem.

In some aspects, a method of foam generation in a liquid includes submitting a gaseous working agent that is compressed and under pressure into an internal storage area of a device. The method also includes transforming the stream of the gaseous working agent by directing the stream of the gaseous working agent over a conical gas ring located at a bottom of an internal cavity of the internal storage area. The method also includes dividing the stream of the gaseous working agent at a base of the conical gas ring into regular intervals of high-speed micro streams of the gaseous working agent. The method also includes changing a direction of movement of the streams of the gaseous working agent. The method also includes inputting the streams of the gaseous working agent into a conical ring cavity of a housing of a foam generator that includes a liquid to generate turbulent streams of a foamed liquid from the liquid due to a pressure decrease in a zone of movement of the streams of the gaseous working agent. The method also includes forming an expanding section of turbulent streams of pseudo-boiling liquid to generate bubbles of the gaseous working agent.

In some embodiments, forming the expanding section of turbulent streams of pseudo-boiling liquid to generate bubbles of the gaseous working agent includes forming turbulent streams of pseudo-boiling liquid to generate bubbles having a finer division, and continually passing through a homogeneous and stable foam until the foam is saturated. In some embodiments, the foam generator is configured to create turbulence to foam the liquid utilizing at least the physical principles of Bernoulli's theorem.

In some aspects, a head for aerodynamic washing, rinsing, or cleaning of surfaces, includes a mechanism for submission of a stream of a gaseous working agent and a device. The device is configured to receive the stream of the gaseous working agent, transform a direction of movement of the gaseous working agent, and provide high pressure streams of the gaseous working agent into a liquid. The head also includes a conical reflector for formation of a ring of turbulent streams of the liquid in an area within the head, the area covering at least a portion of a surface being processed to form a zone of washing, rinsing, or cleaning, In some aspects, a method of aerodynamic washing, rinsing, or cleaning of the surfaces, includes forming in a layer of a liquid in which local washing, rinsing, or cleaning is carried out a volumetric zone including aerodynamic and hydrodynamic washing, rinsing, or cleaning components. The method also includes forming, in the volumetric zone, conical turbulence in a stream having a toroidal ring form.

In some aspects, a device for aerodynamic foaming and mixing of a liquid, the device includes a first hydrodynamic system configured to receive a first liquid component and transform a direction of movement of the first liquid component to form high-speed streams of the first liquid component. The device also includes a second hydrodynamic system for input, processing, and dispersal, consecutively transformed under the form and a direction of movement of streams of the second liquid component directed to specified system under influence of forces of gravitation. The hydro-mechanical interface connects both systems, with conical reflectors in the internal cavities of each of the specified systems.

In some embodiments, the liquid is a water solution including organic and inorganic liquid components. In some embodiments, the first and second hydrodynamic mechanisms are configured to create turbulence to foam the liquid utilizing at least the physical principles of Bernoulli's theorem.

In some aspects, a module for aerodynamic flotation, the module includes a ring working cavity configured to hold a liquid agent, a device configured to provide a gaseous working agent, and a plurality of aerodynamic and hydrodynamic mechanisms mounted on a ring receiver in a bottom portion of the ring working cavity. The aerodynamic and hydrodynamic mechanisms are configured to generate a foam from the liquid agent and the gaseous working agent. The module also includes an overflow mechanism configured to remove a portion of the liquid agent from the ring working cavity when a level of the liquid agent exceeds a level of the overflow mechanism. The module also includes a concentric ring removal cavity disposed inside the ring working cavity in an upper portion of the ring working cavity, the concentric ring removal cavity having an entry portion disposed above a level of the overflow mechanism, the concentric ring removal cavity being configured to collect and remove the foam and a contaminant included in the foam from the ring working cavity.

In some embodiments, the plurality of aerodynamic and hydrodynamic mechanisms includes aerodynamic and hydrodynamic foam generators distributed in regular intervals around the top of the receiver. In some embodiments, the module includes an input device configured to input the liquid agent into the ring working cavity, the input device being located in the ring working cavity at a level below a top of the plurality of aerodynamic and hydrodynamic mechanisms. In some embodiments, the overflow mechanism is located in the ring working cavity at a level below a top of a cylindrical storage tank that includes the ring working cavity and the concentric ring cavity.

In some aspects, a method of creating aerodynamic foaming liquids, due to changes in the form and speed of an aerodynamic stream of a gaseous working agent includes generating a low pressure zone. The method also includes introducing into the low pressure zone micro streams of the compressed gaseous working agent distributed in regular intervals and turbulent toroidal streams of liquid to generate an aerodynamic and hydrodynamic pseudo-boiling region where the streams of the gaseous working agent and the streams of liquid coincide.

In some aspects, a device is configured for foaming the liquids including several components, at least one of which has organic origin. The device includes a plurality of devices for input and transformation of a stream of a gaseous working agent under pressure. The device also includes a foam generator including a mechanism for the consecutive transformation of the stream of the gaseous working agent in a conical ring at the bottom of a foam generator housing, the foam generator housing including an aerodynamic portion and a hydrodynamic portion connected to the aerodynamic portion by a system of capillary apertures distributed on a bottom of the foam generator housing. The device also includes a mechanism configured to change a direction of movement of the gaseous working agent streams and introduce the gaseous working agent streams into a ring of turbulent streams of foam liquid. The device also includes a mechanism configured to produce a saturation ring of turbulent streams of foam liquid bubbles. The device also includes a mechanism configured to form pseudo-boiling layers in a volume of the turbulent liquid streams. The device also includes one or more devices for removal of foam. The device also includes an aerodynamic and hydrodynamic interface connecting aerodynamic and hydrodynamic portions of the device for foaming of liquids, the interface comprising a cylindrical shaft having a first conical reflector on a first side of the shaft and a second conical reflector on a second side of the shaft, where an apex of the first conical reflector points in a substantially opposite direction from an apex of the second conical reflector.

In some aspects, a device for generating a foamed liquid for cleaning includes a cavity configured to hold a liquid. The device also includes a foaming device in the cavity. The device also includes an aerodynamic structure. The aerodynamic structure includes a plurality of air channels configured to generate a stream of compressed air and an output configured to output stream of compressed air to a low pressure zone. The device also includes a hydrodynamic structure. The hydrodynamic structure includes a mechanism configured to produce foam liquid bubbles.

In some aspects, a device includes a holding cavity configured to hold a liquid. The device also includes a first low pressure zone configured to receive a plurality of streams of pressurized gas and generate a foamed liquid from the liquid in the cavity. The device also includes a removal cavity disposed inside the holding cavity configured to collect and remove the foam and a contaminant included in the foam from the holding cavity.

In some aspects, a method includes receiving a gaseous component. The method also includes forming a foamed liquid by combining the gaseous component with a liquid component in a low pressure zone. The method also includes using the foamed liquid to clean a surface.

In some aspects, a device includes an input configured to receive a gaseous component. The device also includes a hydrodynamic structure. The device also includes an aerodynamic structure connected to the hydrodynamic structure. The aerodynamic structure and the hydrodynamic structure are configured to receive the gaseous component and to form a foamed liquid. The device also includes an output configured to deliver the foamed liquid to a surface.

In some aspects, the aerodynamic foam generator of produces a rushing fluid that emerges at a high velocity and possesses high kinetic energy. This creates a highly turbulent and powerful micro bubbling action in the medium where the device is submerged. The foam generator is integrated aerodynamically and hydro-dynamically into its application environment, and therefore can be configured to solve many industrial problems in a large variety of applications. The aerodynamic foam generator is not dependent on what compressed gas is utilized as the active working agent or what type of liquid is utilized.

Fast-propelled fluids have many industrial applications in processes that require cleaning, rinsing, and/or mixing. When used for rinsing or cleaning, the foam generator can be used on a local area or manipulated over a large area, depending on the application. Since it can be light and maneuverable, it can be manipulated manually or automatically to bring it to the local operative surface or specific object. As an alternative, when the operative surface is extensive, a larger assembly including many aerodynamic foam generating heads can be assembled to operate simultaneously over the broad surface of the object.

The modular construction of the foam generating device allows it to be versatile and customizable to many industrial applications. Both the heads and the tubing can be arranged in a variety of configurations, for example, according to the size and shape of the operative surface, and other physical parameters of the application. The foam generator can also have many configurations that make the foam generating device applicable in tight spaces such as pipes and narrow tubes.

The vigorous and turbulent bubbling provided by the aerodynamic foam generator can cause the level of the liquid medium to rise, thereby requiring less of it to submerge the object.

When combined with other technologies, such as electrochemical removal of heavy metals, the aerodynamic foam generator can be used as an effective cleaner that delivers low pH water exhibiting disinfecting and cleaning properties. Furthermore, this type of highly turbulent acidic water has been shown to effectively remove mineral deposits, oil and organics on submerged surfaces.

When used as a mixing apparatus, the aerodynamic foam generating head's bubbling action behaves as a highly efficient stirring agent. As such, it can be introduced to industrial wastewater containing various contaminants. The bubbling action that is produced "activates" the water, thereby facilitating sedimentation and the filtration processes that are to follow. In addition, activated water provides a better environment for chemical reactions to take place. This can be used in many applications in laboratories, pharmaceuticals industries, cosmetics industries, and many other industries.

The turbulent power of the aerodynamic foam generator is not scattered over the entire volume of an immersion tank, rather its full thrust is exerted locally where it is needed most. As a result, much less active fluid is utilized, and less energy and time are consumed.

As the active power of the aerodynamic foam generator is focused, one can control how much and where to apply it. It can be applied more intensively on densely affected zones or evenly over the entire operative surface. For example, in an automated system with flow controls, the aerodynamic foam generator can be mounted onto a robotic immersion arm and can be activated via a valve only while the object is submerged.

The components, including the tubing and aerodynamic foam generating heads, can be made of durable non-corrosive materials such as polypropylene and PVC. These materials are resistant to reactive chemicals and temperature extremes, enabling the device to operate with many active fluids and in many applications.

As used herein, "conical" includes having the shape of a frustum of a cone, sometimes referred to as "frusto-conical".

At the top of the tank, the kinetic energy imparted to the bubbles causes the bubbles to accumulate as a foam on the top of the tank. Impregnation or of foam saturation is a process of gathering all generated bubbles in the top part of the tank in which the generator of foam is established. As there is a delineation between the gathered foam and the liquid, the foam can be therefore removed or skimmed off the top of the liquid surface and the contaminants thereby removed from the tank.

A homogeneous foam is a foam in which diameters of bubbles of gas monotonously repeat. Also, the internal kinetic energy is the same for more than half of the bubbles formed in the volume in which foam is formed.

BRIEF DESCRIPTION OF THE DRAWINGS

FIGS. 4A, 4B, 4C, 4D, 4E, and 4F are diagrams of an interface that includes aerodynamic and hydrodynamic conical reflectors connected by a shaft.

FIG. 5A is a view of an axial section of conical reflector cavities.

FIG. 5B is a plan view of the conical reflector cavities.

FIG. 6 is a diagram of a microbubble.

FIGS. 11, 12, 13, 14, 15A, 15B, 16, 17, 18 and 19 show various views of a foam generator device that can be used to remove contaminants from a liquid.

FIG. 26 is a diagram of the turbulence level in stages of transformation of the cross section of the air flow in the foam generator;

FIG. 28 is a diagram of vortex channels forming in the foam generator;

FIG. 29 is a vortex channels and micro-bubbles formation diagram in the plane section of the foam generator; and FIG. 30 is a vortex channels and micro-bubbles formation diagram in the vertical cross section of the foam generator.

DESCRIPTION

Figure 1:
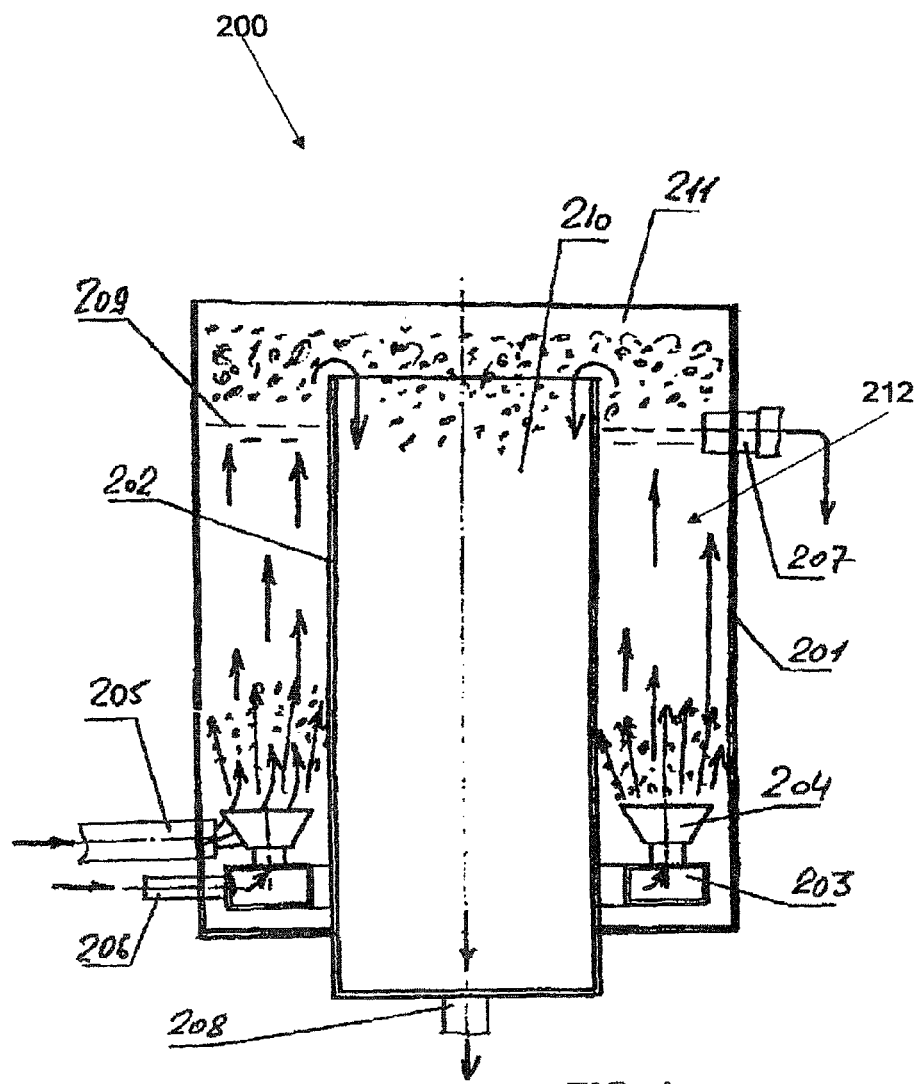
FIG. 1 is a diagram of a water purification system.

FIG. 1 shows a system 200 for removing impurities from a liquid such as water. The system 200 includes a holding cavity 212 formed from a housing 201 configured to hold a liquid to be purified. The system 200 also includes one or more foam generators 204 located inside the holding cavity 212. The foam generators 204 receive a pressurized gas and mix the gas with the liquid in the holding cavity 212 to form a foam. The foam formed by the foam generators 204 rises to a surface 209 of the liquid in the holding cavity 212 and forms a foam layer 211 in the top part of a housing 201. Impurities from the liquid such as organic impurities, oil, heavy metals, minerals, oxides and the like are suspended in the foam layer 211. A removal cavity 210 located within the holding cavity 212 allows for removal of the foam layer 211 from the top part of housing 201. The foam and contaminants are further removed from the system 200 using a removal pipe 208 connected to the removal cavity 210. The foam and any contaminants and impurities from the liquid (e.g., organic impurities, heavy metals, oxides, mineral deposits, oil) trapped in the foam are removed via the removal cavity 210.

The holding cavity 212 is formed in an area between an internal surface of a housing 201 and an external surface of an internal housing 202. In some embodiments, both housing 201 and housing 202 are cylindrical in shape and the housing 202 is located concentric to housing 201. However, other shapes of housing 201 and 202 and locations of housing 202 are possible. A pipeline 205 inputs the liquid into the holding cavity 212. Due to its location near the bottom of the holding cavity 212, pipeline 205 introduces the liquid to be processed at a location near the foam generators 204. The system 200 also includes an overflow pipe 207 that removes liquid that rises to a level higher than a specified level in the holding tank 212. The overflow pipe 207 is located at a height less than the height of an entrance into the removal cavity 210 to prevent the liquid from flowing into the removal cavity 210.

In order to generate the foam, compressed air is supplied from a pipe 206 to the foam generators 204 by a ring receiver 203. The ring receiver 203 receives the compressed gas from pipe 206 and distributes the air to the multiple foam generators 204. The foam generators 204 generate foam by creating turbulence in a stream of liquid and gas and mixing the liquid and gas to form microbubbles. In general, the microbubbles have an interior portion (also referred to as a kernel) formed of compressed air (or another gas) and an exterior shell formed of the liquid in holding cavity 212. Due to the air in the bubbles, the bubbles rise to the surface 209 of the liquid where they can be removed through the cavity 210 as described above.

System 200 can be used, for example, to remove oil from water. In such applications the oil-water mixture is submitted to the holding cavity 212 by pipe 205. When the microbubbles are generated, the air in the microbubbles causes the microbubbles to rise through the liquid in the holding cavity 212. As the bubbles pass through the liquid, the oil in the liquid adheres to the shell of the microbubble and is trapped in a foam 211 of the microbubbles on the surface 209 of the liquid. The oil is them removed with the foam via the removal cavity 210.

In another example, system 200 can be used to remove organic impurities from water. For example, system 200 can be used to purify water for drinking or for use in a process which requires low impurity counts such as semiconductor fabrication, industrial processes, cleaning processes, and the like. In such examples, the water that includes impurities is submitted to the holding cavity 212. When the microbubbles are generated, the air in the microbubbles causes the microbubbles to rise through the liquid in the holding cavity 212. As the bubbles pass through the liquid, the impurities in the liquid adhere to the shell of the microbubble and are trapped in a foam of the microbubbles on the surface 209 of the liquid. The impurities are removed with the foam through the removal cavity 210.

Figure 2:
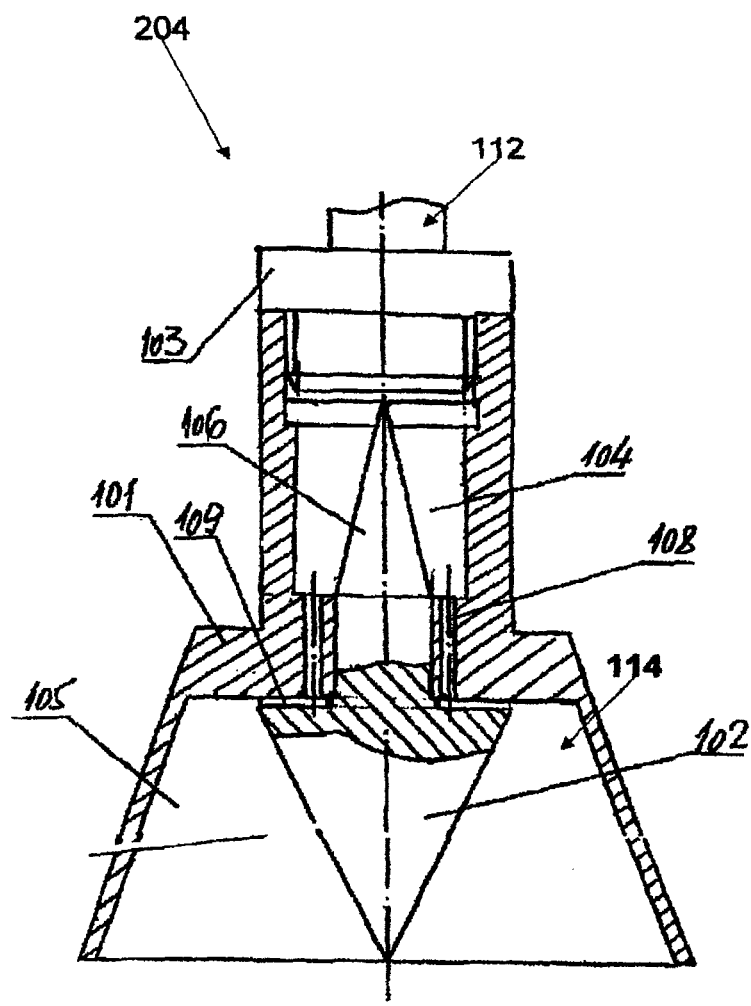
FIG. 2 is a cross-sectional view of an aerodynamic foam generator.
Figure 3:
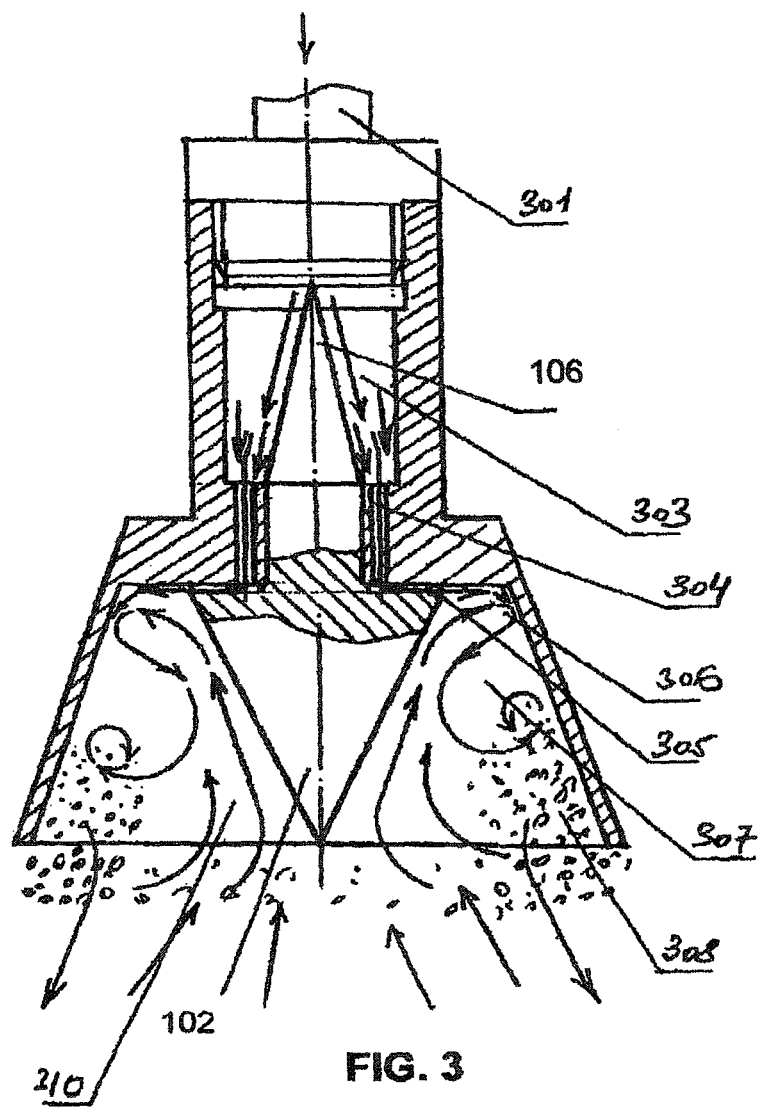
FIG. 3 is a diagram of the flow of gas and liquid in the aerodynamic foam generator of FIG. 2.
Figure 5C:
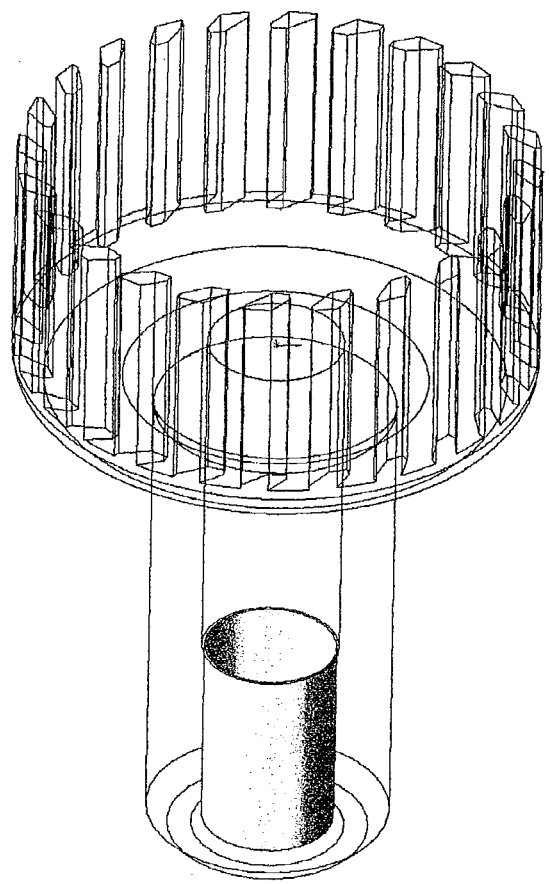
FIG. 5C is a view of the foam generator housing with stream flow brake pins.

Referring to FIGS. 2 and 3, FIG. 2 shows a cross-sectional view of an exemplary foam generator 204 and FIG. 3 shows the flow of liquids and air within the foam generator 204 of FIG. 2. During use, the foam generator 204 is submerged in the liquid within a housing (as shown above) and mixes the liquid with compressed gas to form microbubbles for removing impurities from the liquid.

The foam generator 204 includes a housing 101 that receives a stream of compressed gas and transforms a direction of the flow of the compressed gas. The housing 101 is connected to a device 103 for input of the gas to the foam generator 204 which is connected to a pipeline 112 allowing the input of gas into the foam generator 204 through the device 103 (as indicated by arrow 301). The housing 101 of the foam generator 204 forms a cavity 104 having a conical shape that receives the compressed gas from the pipeline 112. A cone 106 is located inside the cavity 104 such that gas passing through the cavity 104 passes over the cone 106. The cone 106 has a conical shape with a tip pointing toward the end of the cavity 104 where the compressed gas enters from the pipeline 112. The inclusion of the cone 106 in the cavity 104 decreases the area in which the gas can flow and increases the pressure of the gas. The cone 106 also modifies the direction of the air flow in the foam generator 204 (as indicated by arrow 303) and directs the compressed air into a set of longitudinal channels 108 (as indicated by arrow 304). The longitudinal channels 108 are distributed in regular intervals about the base of cone 106 and divide the stream of the compressed gas into capillary micro-streams of compressed gas. In general, the spacing of the longitudinal channels 108 and the number of longitudinal channels 108 can be based on the size of the foam generator 204. The longitudinal channels 108 are connected at one end to the cavity 104 near the base of the cone 106 and at the other end to a system of radial channels 109. The radial channels 109 are disposed at an angle from the openings 108 such that the compressed gas passing through the longitudinal channels 108 and into the radial channels 109 changes direction (as indicated by arrow 305). For example, the radial channels 109 can be disposed at about a ninety degree angle with respect to the longitudinal channels 108. The change in the direction of the airflow increases the turbulence in the airflow such that the gaseous working agent is dispersed at high speed, creating a local area of low pressure.

The reflector of a hydraulic part of the generator of foam (102 in FIG. 2) has two basic functions. The external conical surface of the reflector distributes and allocates a volume of liquid, which is performed in a conical funnel, and distributes and allocates a liquid in such a manner that on the conical surface of a reflector, the liquid flows down in a bottom of a cavity 105 and cuts off a part of a stream of gas that moves in the channel 109.

The base of the cone 102, designated as 109, has a function of reflecting streams of gas that move in channels 108 and turning the specified streams in the channel formed by the bottom of the housing 101 and the base of the cone 109 and forming a certain thickness of the moving stream of gas therein. The distance between a surface of the based of cone 102 and the bottom of housing 101 is equal to the diameter of the bubbles of gas that are formed in this channel. For example, micro-bubbles are formed in this channel.

The reflector of hydraulic part 106 has function of transforming a stream of gas in such a manner that a zone with a laminar level is not formed in the center of the stream. The cone 106 forces out the gas stream to the periphery of channel 104 where the stream has a high level of turbulence and then the stream input into regularly dispersed channels 108, whose design eliminates aerodynamic resistance.

Due to the high speed of movement of the stream of compressed gas through the system of radial channels 109, when the compressed gas exits the system of radial channels 109 a local zone of low pressure 114 is formed at the point where the compressed gas exits the system of radial channels 109 (as indicated by arrow 306). Because of this low pressure, higher pressure liquid is drawn toward conical reflector 102 and toward low pressure zone 114. The liquid in a truncated conical cavity 105 is mixed with the air from the system of radial channels 109 in the local zone of low pressure 114. The liquid is delivered into the local zone of low pressure 114 through the cavity 105 (as indicated by arrow 310). The cavity 105 is conical in shape with a decreasing cross-sectional area such that the cavity 105 has a greater diameter at an entrance to the cavity and a smaller diameter near the low pressure zone 114. The decreasing diameter of the cavity 105 increases the turbulence in the flow of liquid in cavity 105. A cone 102 is located inside the cavity 105 such that liquid passing through the cavity 105 passes over the cone 102. The cone 102 has a conical shape with the tip of pointing toward the entrance to the cavity 105. The conical shape of the cavity 105 and cone 102 increases turbulence in the liquid due to the increased contact of the liquid with its surfaces.

The mixture of gas and liquid generates a pseudo-boiling volume in the low pressure zone 114 of the foam generator 204. The liquid and gas mixture flows away from the low pressure zone 114 and into an area with a larger diameter. The pressure in the liquid and air mixture increases as the pseudo-boiling volume flows away from the low pressure zone 114 forming a foam of micro-bubbles of the liquid that exit the foam generator 204 and rise to the surface of the foam generator 204 (as indicated by arrow 308). As the microbubbles are displaced from the low pressure zone 114, some of the bubbles of gas start to burst and turn to finer bubbles. Thus, foam leaves the area of the hydrodynamic conical reflector 102 and the liquid from the burst bubbles goes towards the jets of the gaseous working agent (rather than rising to a surface of the liquid in the cavity). This recycling of some of the liquid from burst bubbles creates additional turbulent flow and increased foam.

Exemplary Components of the Foam Generator

Various methods can be used to manufacture the foam generator 204 described herein. In some embodiments, as shown in FIGS. 4A-4F and 5A-5C, the foam generator 204 can be made from two separate components including a housing 101 and an interface 140. The housing 101 is sized to fit over the interface 140 to form the foam generator 204.

In FIGS. 4C and 4D, models of reflectors in which channels for division of a stream of gas are executed on a cylindrical surface are shown. Such variant of performance can be more convenient for manufacturing and can reduce the cost of a reflector.

In FIGS. 4E and 4F, the design of the combined reflector in which hydraulic and pneumatic parts are executed is shown. Only at installation, in the case of the generator, are the parts assembled.

More particularly, the interface 140 includes two cone-shaped reflectors (e.g., an aerodynamic reflector 106 and a hydrodynamic reflector 102) connected by a shaft 132. The aerodynamic reflector 106 is located on one end of the shaft 132 and, in use, is directed against a direction of movement of a stream of the compressed gaseous working agent. The hydrodynamic reflector 102 is located at the opposite end of shaft 132 and, in use, directs movements of formed foams. The interface 140 also includes a collection channel 130 located at the base of the shaft 132 for receiving the compressed gaseous agent. The interface also includes channels 405 that are located at the base of the conical surface of the hydrodynamic reflector 102. The channels 405 are connected to the channel 130 and are regularly distributed on the same plane. In general, each channel has equal length and equal section to promote dispersal of the compressed gaseous working agent into streams into a ring of turbulent liquid streams in cavity 105. When the housing 101 and interface 140 are connected a surface of the housing in combination with channels 405 form channels 109 in which the air flows.

The housing 101 includes a central orientation hole 120 (FIG. 5A) between an inside chamber 104 and a conical opening 105. The central orientation hole 120 is configured to fit over the aerodynamic reflector 106 of the interface 140 such that, when the housing 101 and the interface 140 are connected, the aerodynamic reflector 106 is located inside the chamber 104 of the housing 101 and the hydrodynamic reflector 102 is located inside the conical opening 105. The housing also includes multiple apertures 108 located concentric to the central orientation hole 120. Apertures 108 unite the aerodynamic and hydrodynamic zones of the generator and provide a channel through which the air flows.

In general, the housing 101 and interface 140 can be made of a material capable of withstanding substantial degradation in the liquid. Exemplary materials include stainless steel and plastic. Forming the foam generator 204 from two separate components can provide various advantages. For example, the individual components may be less complicated to produce. In some embodiments, the pieces can be die cast eliminating the need for expensive tooling processes.

Microbubbles

FIG. 6 shows an exemplary structure of a liquid microbubble 50 generated by the foam generator 204. In general, the microbubble 50 is formed of a core of compressed gas 52 surrounded by a liquid shell 54. The liquid shell is formed of a liquid that is included in the system 200 to be purified. The core of compressed gas 52 has a diameter 58 and the shell 54 of liquid has a thickness 60. Together the core 52 and shell 54 form a bubble having a diameter 56. In order for the micro-bubble to remain stable for a length of time prior to removal of the foam and sediments from the system 200, the shell of the liquid surrounding the compressed gas must be thick enough to prevent the microbubble from bursting. On the other hand, in order for the microbubble of fuel to rise to the surface of the liquid, the core of compressed gas must be large enough to increase the buoyancy of the bubble. In general, a ratio of the diameter 58 of the core 52 to the thickness 60 of the shell 54 of liquid is between about 1.5 and about 2.5 (e.g., between about 1.8 and about 2.2, between about 1.9 and about 2.1, about 2).

System for Aerodynamic Flotation

Figure 7:
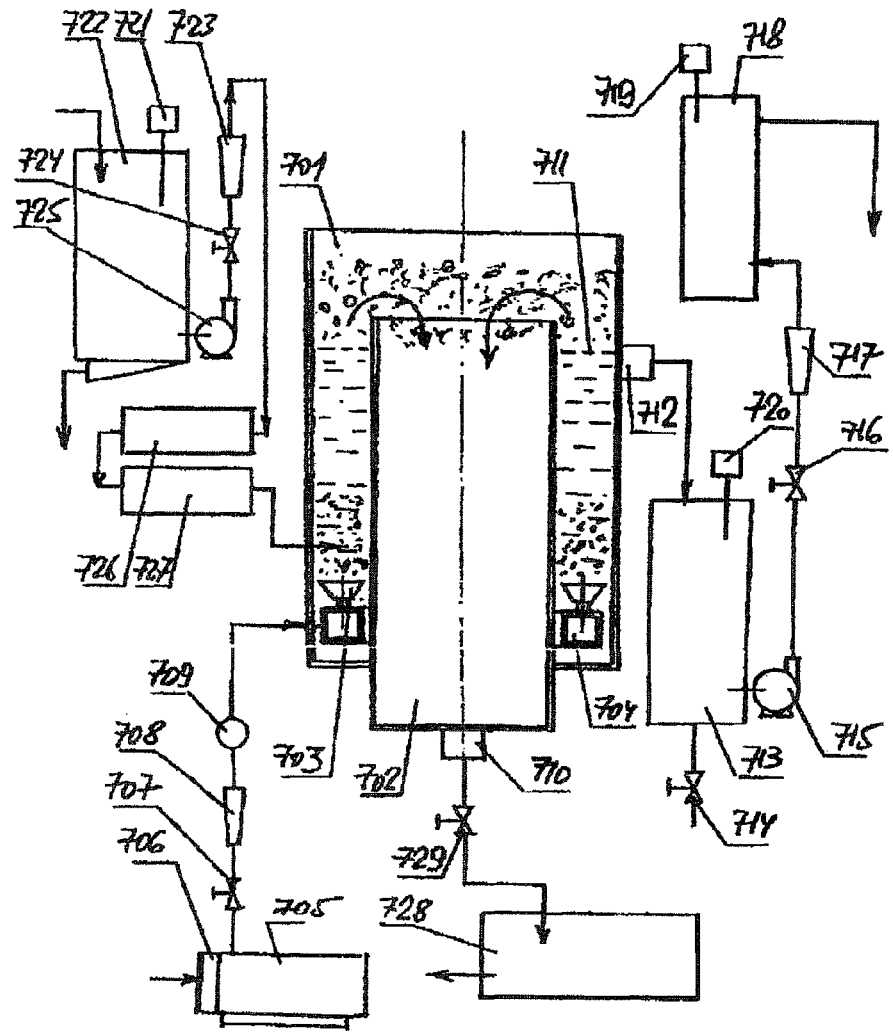
FIG. 7 is a diagram of a water purification system.

FIG. 7 shows a block diagram of a module which uses aerodynamic foam generators for flotation of impurities from a liquid. The system includes a cylindrical container 701 to contain the liquid to be processed. Multiple aerodynamic foam generators 703 are located in the cylindrical container 701. The aerodynamic foam generators 703 are connected to a ring receiver 704 that holds of the foam generators 703 and connects the foam generators 703 to a supply of a compressed gaseous working agent, for example air. A coaxial cylindrical container 702 is located coaxially with the cylindrical container 701 and is used for gathering and condensing of foam generated by the aerodynamic foam generators 703. The cylindrical container 702 is connected to a pipe for condensate removal 710 that removes the foam and impurities collected and condensed within the coaxial cylindrical container 702. The pipe for condensate removal 710 is connected to a tank 728 via an adjusting valve 729. The foam and impurities are collected in the tank for disposal.

The cylindrical container 701 is also connected to a system that inputs the water or liquid for purification that includes a tank 722 for storing a liquid intended to be processed. The liquid is moved from the tank 722 to the coaxial cylindrical container 702 through one or more sets of mechanical filtration that remove impurities from the liquid. The tank is connected to a set of gauges 721 including a level gauge, a pressure gauge, a temperature gauge, a conductivity gauge, a density gauge, an acidity or alkalinity gauges, and others gauges depending on the composition of the liquid. A centrifugal pump 725 pumps the liquid from tank 722 through an adjusting valve 724 and channel gauge 723. The liquid is transported by pump 725 to a first step of a mechanical filter 726 and optionally a second step of a mechanical filter 727 that remove solid impurities from the liquid prior to submitting the liquid to the cylindrical container 701.

The cylindrical container 701 is also connected to a system that inputs the compressed air to the foam generators 703. The system that inputs the compressed air includes a compressor 705. An air filter 706 can be connected on the input side of the compressor to filter the air prior to submission to the foam generators 703. An adjusting valve 707, pneumatic gauge 708, and a manometer 709 are used to adjust the pressure and amount of air input into the foam generators 703.

The cylindrical container 701 is also connected to a system that outputs the filtered liquid from the cylindrical container 701. Liquid that rises above a level 711 in cylindrical container 701 is removed through a pipe 712 connected to the cylindrical container 701 at level 711. Pipe 712 is connected to a tank 713 that collects the processed water. A level gauge 720 monitors the level of water in the tank 713. The tank is connected to a drainage valve 714 that removes liquid from the tank and to a centrifugal pump 715 that pumps the water to a location for use. The pump 715 is connected to an adjusting valve 716 and a channel valve 717. A mechanical filter 718 filters the water from tank 713. The filter 718 is connected to a pressure valve and the pressure relay 719.

In exemplary embodiments, during use, the liquid from working baths of industrial process lines collects in a tank 722 and is checked by the system of gauges 721. The process liquid is pumped by a pump 725 through valve 724, measured and controlled by a channel gauge 723 and submitted to one or more solid filtration stages 726 and 727. After solid filtration, the liquid is submitted into a ring cavity formed in coaxial cylindrical tanks 701 and 702. In ring cavity 701 the liquid rises up to a level 711 and liquid above the level 711 is removed by pipe 712. In the base of ring cavity 701 multiple foam generators 703 are mounted on the ring receiver 704 and distributed, in regular intervals on a circle. The ring receiver 704 is connected to compressor 705 by a compressed gas or air pathway that includes the valve 707 and gauges 708, 709. Compressed air is provided to the aerodynamic foam generators 703 and the aerodynamic foam generators 703 form a foam in the liquid. The foam moves through the liquid in the ring cavity 701 and separates various impurities from the liquid. Thus, the liquid continues to be submitted to the ring cavity and continues to flow from the cavity through pipe 712. The speed of the ascending stream of liquid is adjusted depending on the physical and chemical properties of the liquid. For example, the submission and removal rate can be decreased if the liquid has a higher concentration of impurities.

The liquid that rises to level 711 is removed from the ring cavity 701 by pipe 712 and is input into a collection tank 713. The liquid collected in tank 713 can then be moved by pump 715, through the valve 716 and gauge 717 to a filter 718. From the filter 718, the liquid can be provided to additional stages of cleaning or purification, or returned to the consumer of the processed liquid. Thus, there is a constant control of parameters and qualities of a liquid by means of the complete set of devices 719.

The foam, with collected impurities in the foam, rises above a top edge of tank 702 into the tank 702. After condensation of the foam, the foam exits through pipe 710. The removal of the condensed foam is controlled by valve 729 and the foam is collected in tank 728, where the condensate and its impurities are removed from the system and can be recycled.

Foam Generator for Cleaning

Figure 8:
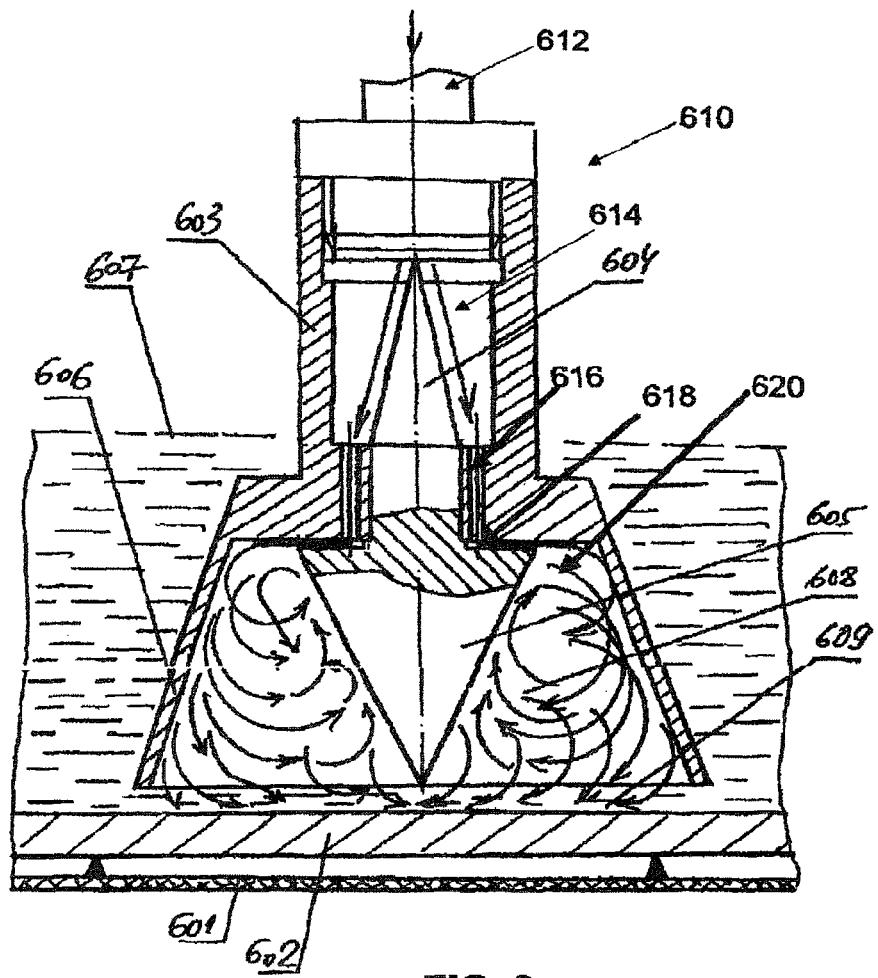
FIG. 8 is a diagram of an aerodynamic washing, rinsing or cleaning head.

Referring to FIG. 8, a system 600 that includes an aerodynamic-hydrodynamic head 610 for washing, rinsing, and/or cleaning applications is shown. The aerodynamic-hydrodynamic head 610 can be similar in structure to the foam generators described above, for example foam generator 204 of FIGS. 2-3 and foam generators on FIGS. 20A, 20B, 20C, 20D, 20E, and 20F.

During use, the aerodynamic-hydrodynamic head 610 is inserted into a bath 601 in which the processing (e.g., washing, rinsing, and/or cleaning) is carried out. The bath is filled with a liquid that is used for cleaning Exemplary liquids include water, a water and cleaning agent mixture, an acid, and the like. The liquid is filled to a level 607 such that the liquid fully covers the surface 602 of an object to be cleaned and so that the liquid fills an open region 608 of the aerodynamic-hydrodynamic head 610.

Figure 9:
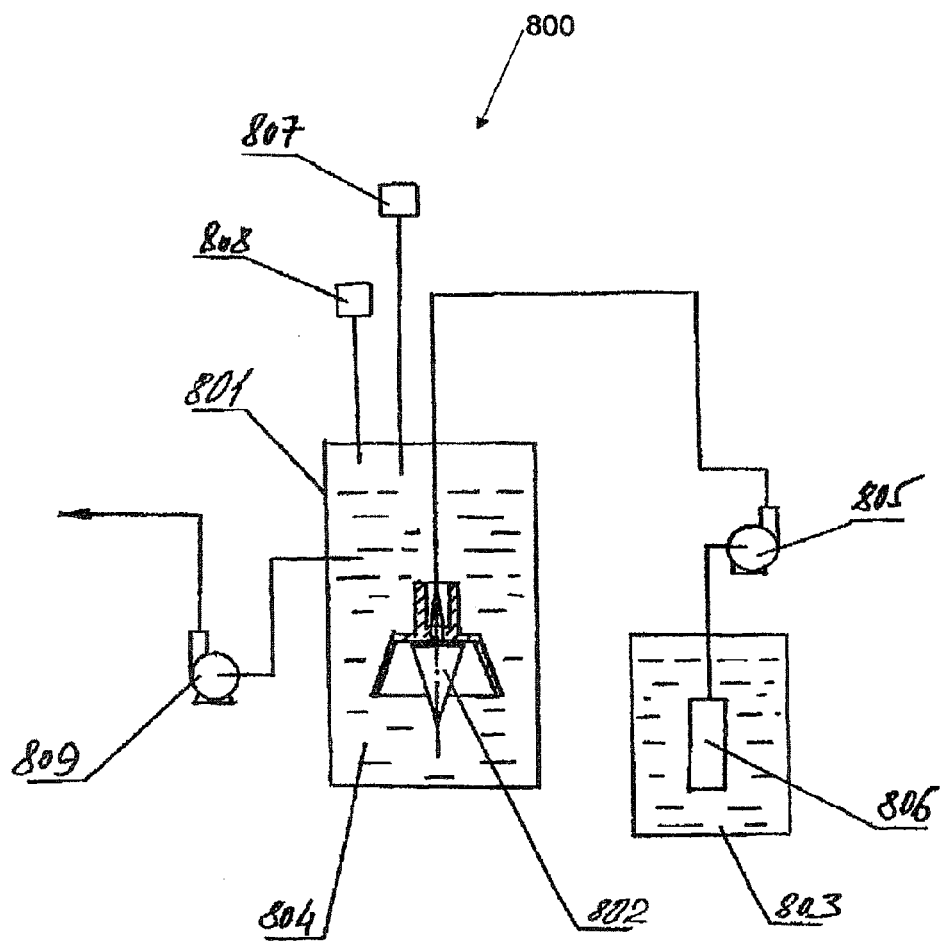
FIG. 9 is a diagram of a liquid mixing system.
Figure 10:
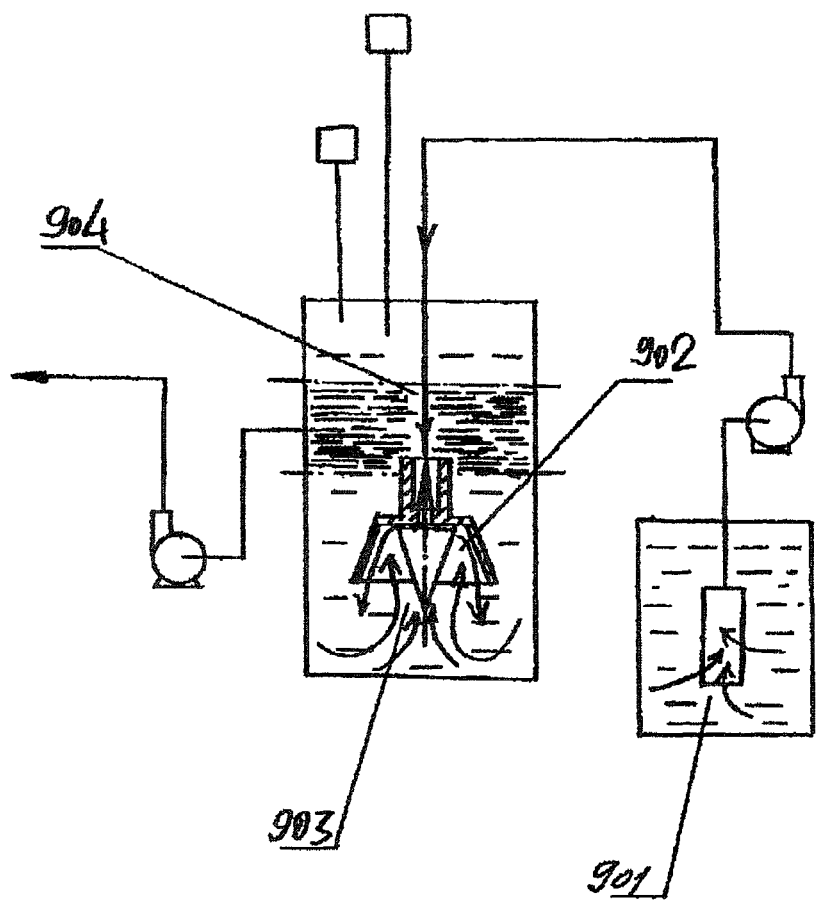
FIG. 10 is a diagram of the flow of liquids in the liquid mixing system of FIG. 9.
Figure 11:
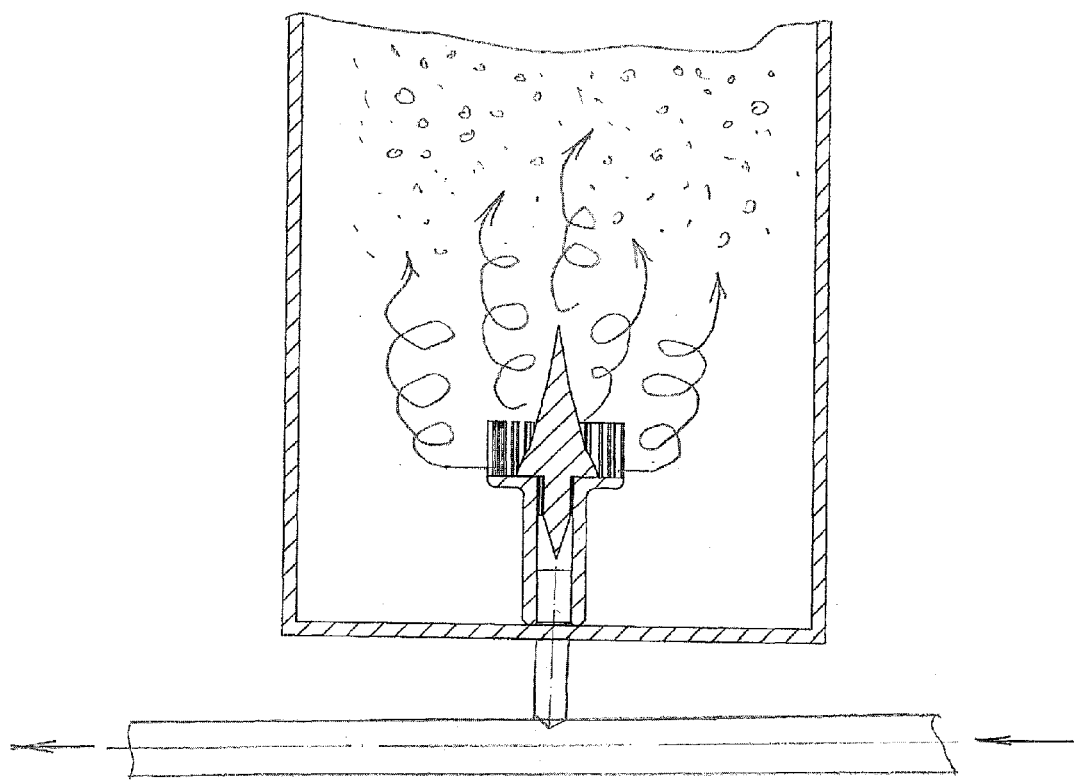
Figure 12:
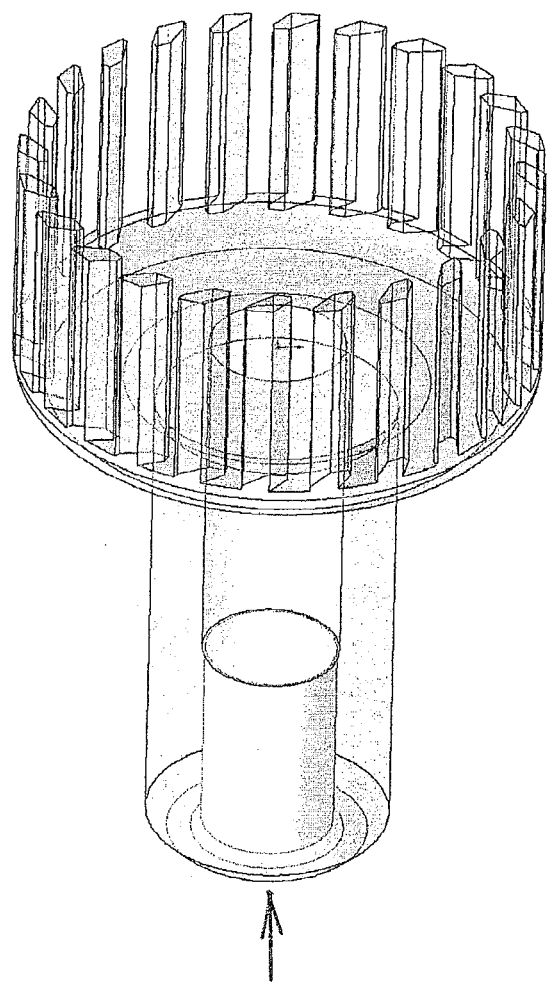
Figure 13:
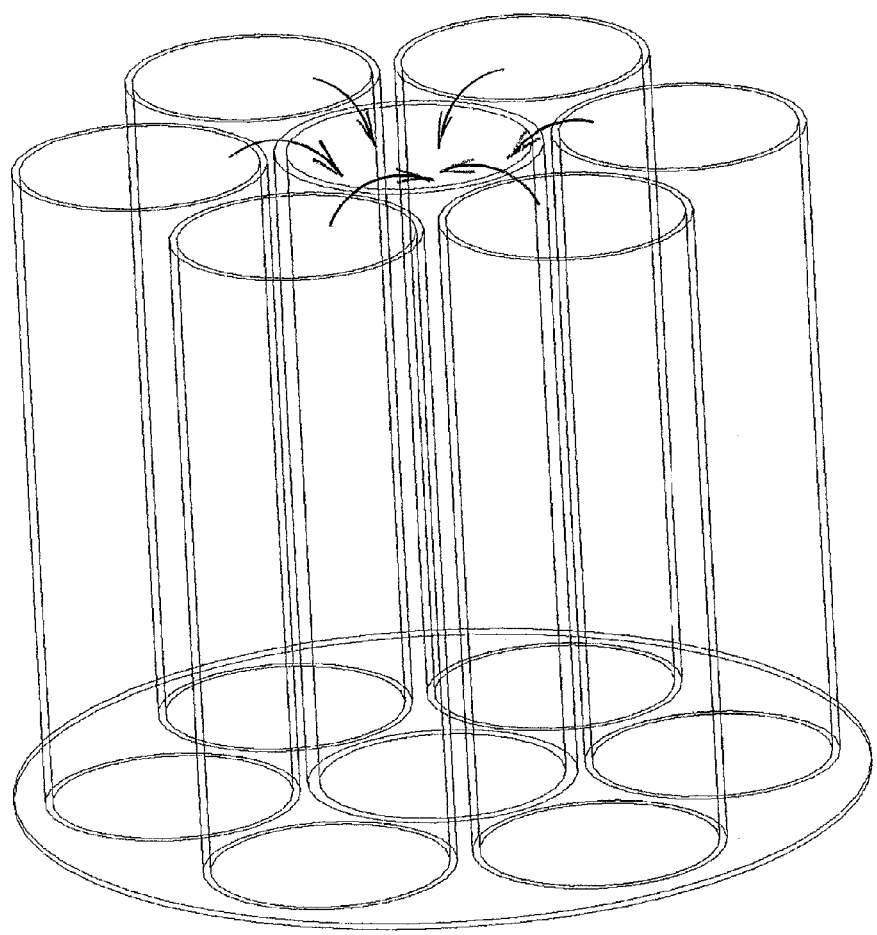
Figure 14:
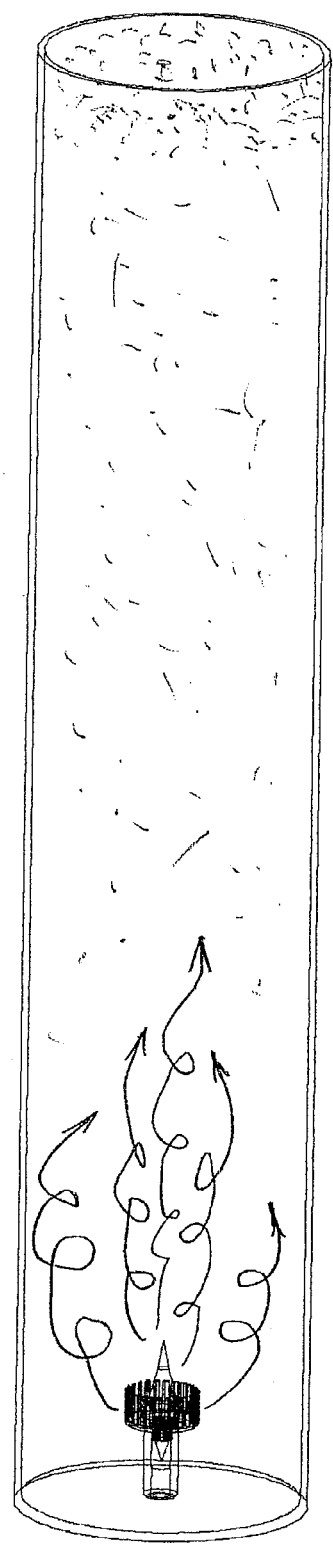
Figure 19:
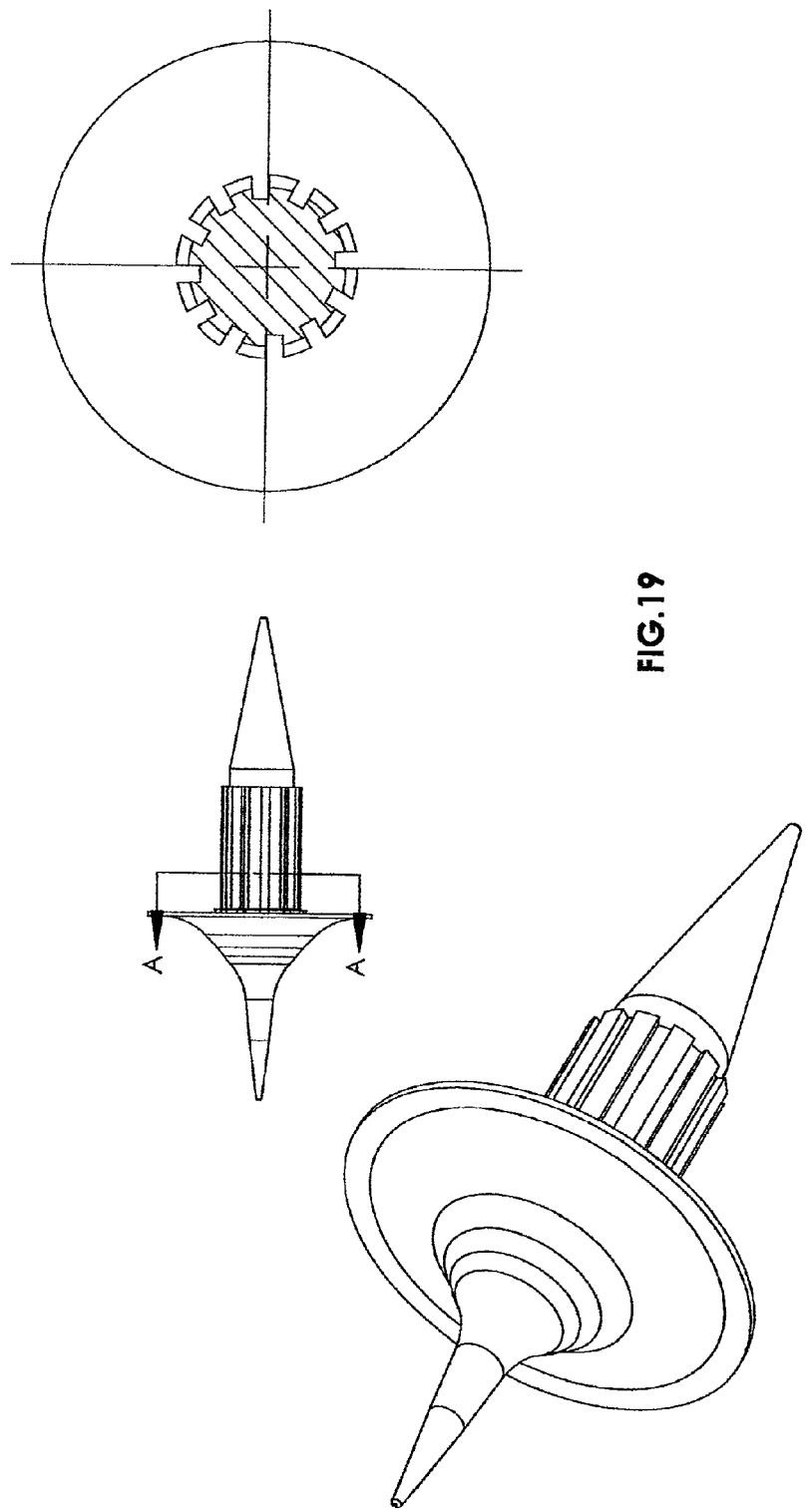
Figure 20A:
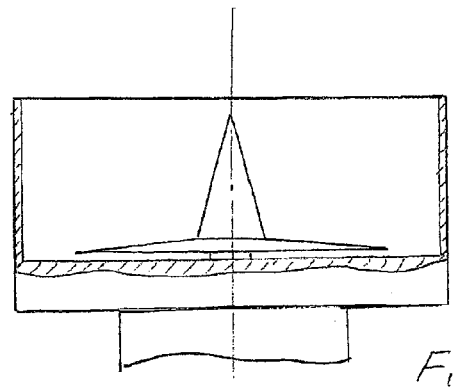
FIGS. 20A, 20B, 20C, 20D, 20E, and 20F show various views of the cross section of a foam generator that can be used in surface cleaning with generated dynamic foam.
Figure 20B:
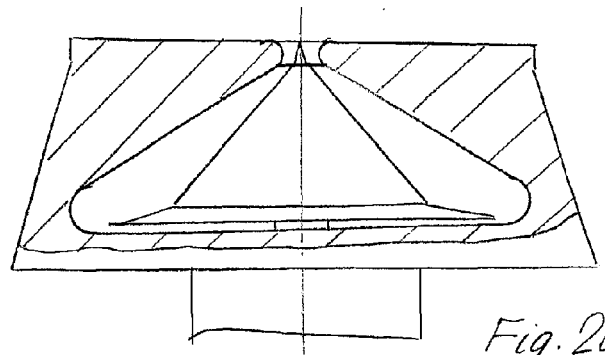
Figure 20C:
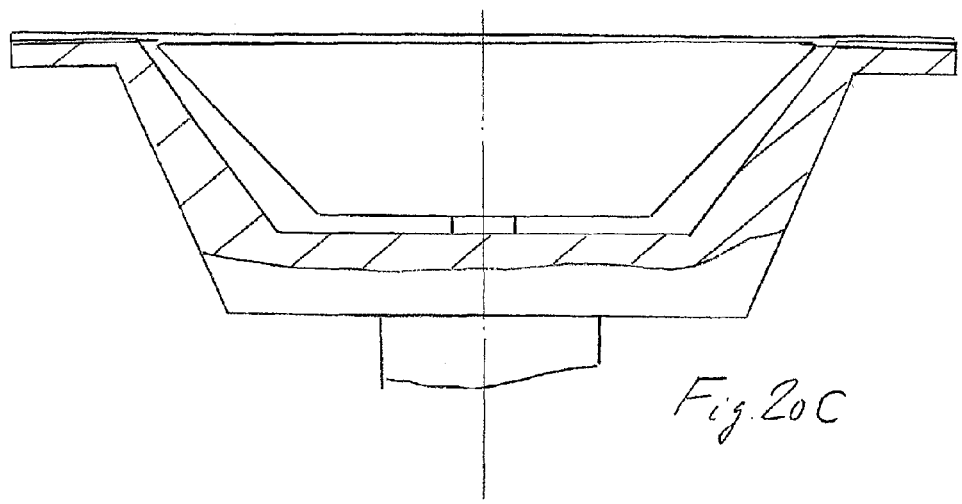
Figure 20D:
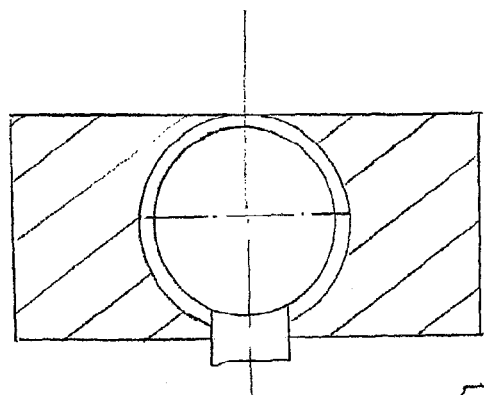
Figure 20E:
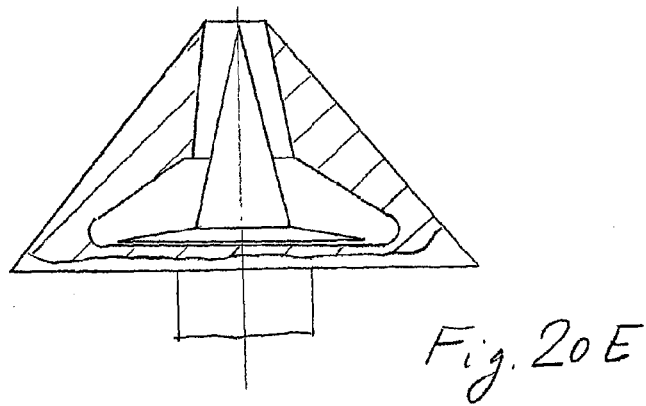
Figure 20F:
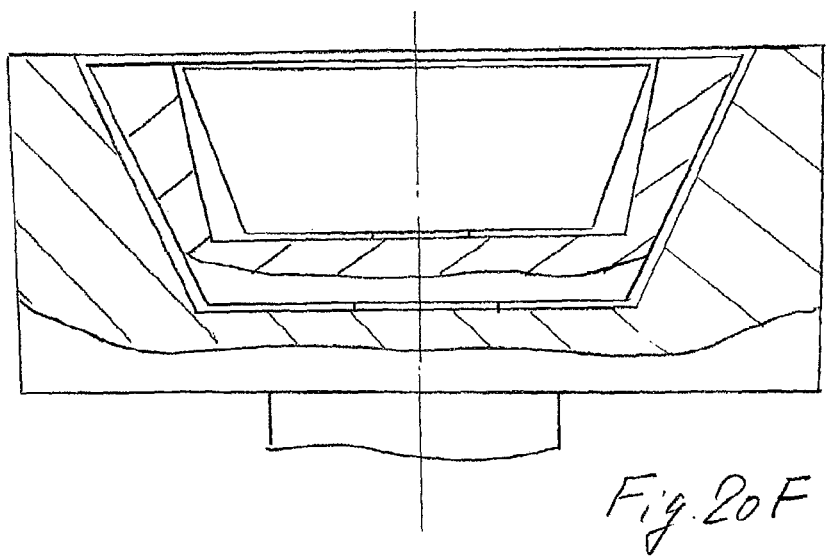

During use, air is directed from a pipe 612 into a cavity 614 that includes a cone shaped aerodynamic reflector 604. The air is forced over the aerodynamic reflector 604 and into a plurality of channels 616. The channels 616 are connected to multiple radially disposed channels 618. The air changes direction as the air moves from channels 616 and into channels 618 increasing the turbulence in the air. The air is output from the channels 618 into a low pressure zone 620. The liquid solution is drawn into a conical shaped housing 606, over a hydrodynamic reflector 605, and into the low pressure zone 620. Bubbles of foamed liquid and air are generated in the low pressure zone 620. The movement of the liquid forces the foam from the low pressure zone 620 and out of the conically shaped housing 606 to form a zone 609 of intensive washing, rinsing, and/or cleaning Mixing of Two or More Liquids While in the embodiments described above, a device mixes compressed air and a liquid in a low pressure zone to form microbubbles, in some embodiments, as shown in FIGS. 9 and 10, two liquids can be mixed to generate a turbulent liquid. For example, rather than receiving a compressed gas, a device for aerodynamic foaming and mixing of a liquid 802 can include a first hydrodynamic system configured to receive a first liquid component and transform a direction of movement of the first liquid component forming high-speed streams of the first liquid component. The device can also include a second hydrodynamic system for input, processing, and dispersal of streams of the second liquid component directed to specified system under influence of forces of gravitation. The hydro-mechanical interface connects both systems, with conical reflectors in the internal cavities of each of the specified systems.

The system for mixing of liquids 800 includes a tank 801 with a liquid, or a mixture of liquids. The tank includes a foam generator 802 (e.g., a foam generator similar in structure to those described herein). System 800 also includes a second tank 803 with another liquid or mix of liquids. A pump 805 connects the second tank 803 with the first tank 801 and transports liquid from the second tank 803 into the foam generator 802 located in the first tank 801. An inlet filter 806 connected to an inlet of the pump 805 filters the liquid submitted to the foam generator 802. During use, referring to FIG. 10, the liquid from the second tank 803 is drawn into the filter 806 by the pump 805 (arrow 901) and carried through a pipe to the foam generator 802 (arrow 904). The liquid from tank 801 is drawn into the foam generator 802 (arrow 903) in a region where the liquid from tank 803 is output from the foam generator 802 such that mixing the liquid from tank 801 with the liquid from tank 801 occurs (902). A pump 809 is connected to the tank 801 to remove the liquids after mixing. In some embodiments, the mixing of the liquids can be monitored by one or more sensors such as a level sensor 808 and/or a conductivity meter 807. By monitoring characteristics of the liquid mix in tank 801, the amount of the second liquid from tank 806 provided by pump 805 can be modified to generate an appropriate mixture.

Applications of the device for hydrodynamic mixing liquids can include mixing technological solutions for manufacture of electronic devices. The solutions can include mixed components that are difficult to mix, for example, liquid ammonium and alkaline etching solutions. The use of hydrodynamic mixing can be used as an alternative to the mechanical mixing.

In some applications, the hydrodynamic mixing can be used to mix liquids having different viscosities. In such applications, the more viscous liquid is under pressure of gravitation, and the less viscous liquid is entered into a zone of mixing under pressure.

In some applications, the hydrodynamic mixing can be used to mix liquids having different conductivities. For example, the liquid with smaller conductivity can be under pressure of gravitation and the liquid with greater conductivity can be entered into a zone of mixing under a high pressure. The control of a level of conductivity of liquids over mixing can be carried out by a contactless method.

In some applications, the hydrodynamic mixing can be for one or more of the following types of mixing: mixing organic and inorganic liquids, mixing various liquids on density, mixing the liquids containing nano-composite extenders, mixing liquid components in the food-processing industry, mixing liquids where one liquid is aggressive, mixing liquids where one of the liquids is super pure, mixing liquids where one of the liquids is toxic, mixing spirit and water in the industry of alcoholic drinks, mixing components in the industry of soft drinks, mixing two aggressive liquids, mixing two super pure liquids, mixing two toxic liquids, step mixing more than two liquids, step mixing more than two aggressive liquids, step mixing more than two toxic liquids, mixing of two electrically charged liquids for the subsequent processing and neutralization of surfaces with static electricity, mixing of two electrically charged liquids for deactivation of surfaces with radioactive infection, mixing nutritious solutions for hydroponics, mixing liquid fertilizers for watering in an agriculture, mixing liquid dyes in large polygraphic machines such as cars, mixing water and superficially active substances for operations washing in technological complexes of the aviation industry, mixing water and liquid washing-up liquids in systems technological washing in all industries, mixing liquid technological solutions in conditions of pure (e.g., clean) rooms in semi-conductor manufacture, mixing liquid chemical reagents in conditions when it is necessary to exclude their contact to air, mixing liquids with aerosols (e.g., sprays), mixing liquids with emulsions, mixing two aerosols, mixing of two emulsions, mixing easily evaporating liquids, mixing liquids with heat, mixing liquids in their dynamical directed stream, and/or mixing liquids with different temperatures.

FIGS. 11-19 show another embodiment of a foaming device which can be used to remove contaminants from a liquid. The device includes a tall tank that holds a liquid to be processed. The tank can have a height of from about 1 foot to about 10 feet. In general, the height of the tank is selected such that the water pressure forces the water down over a conical portion of the foaming device. Compressed air is mixed with the liquid at the base of the conical portion. The aerodynamic portion of the device is similar to those disclosed herein and shown in detail in FIGS. 15A, 15B, 16, 17, 19 and 20. After the liquid is forced down due to gravity over the cone, the air is mixed with the liquid and a foam exits the foam generator through openings in a side of the foam generator. In general, a set of pillars or upwardly extending portions can be located around the conical portion and can increase the turbulence in the liquid as the foam is generated. An example of the movement of the liquid and foam is shown, for example, in FIGS. 12, 14, 15A and 15B.

Figure 21:
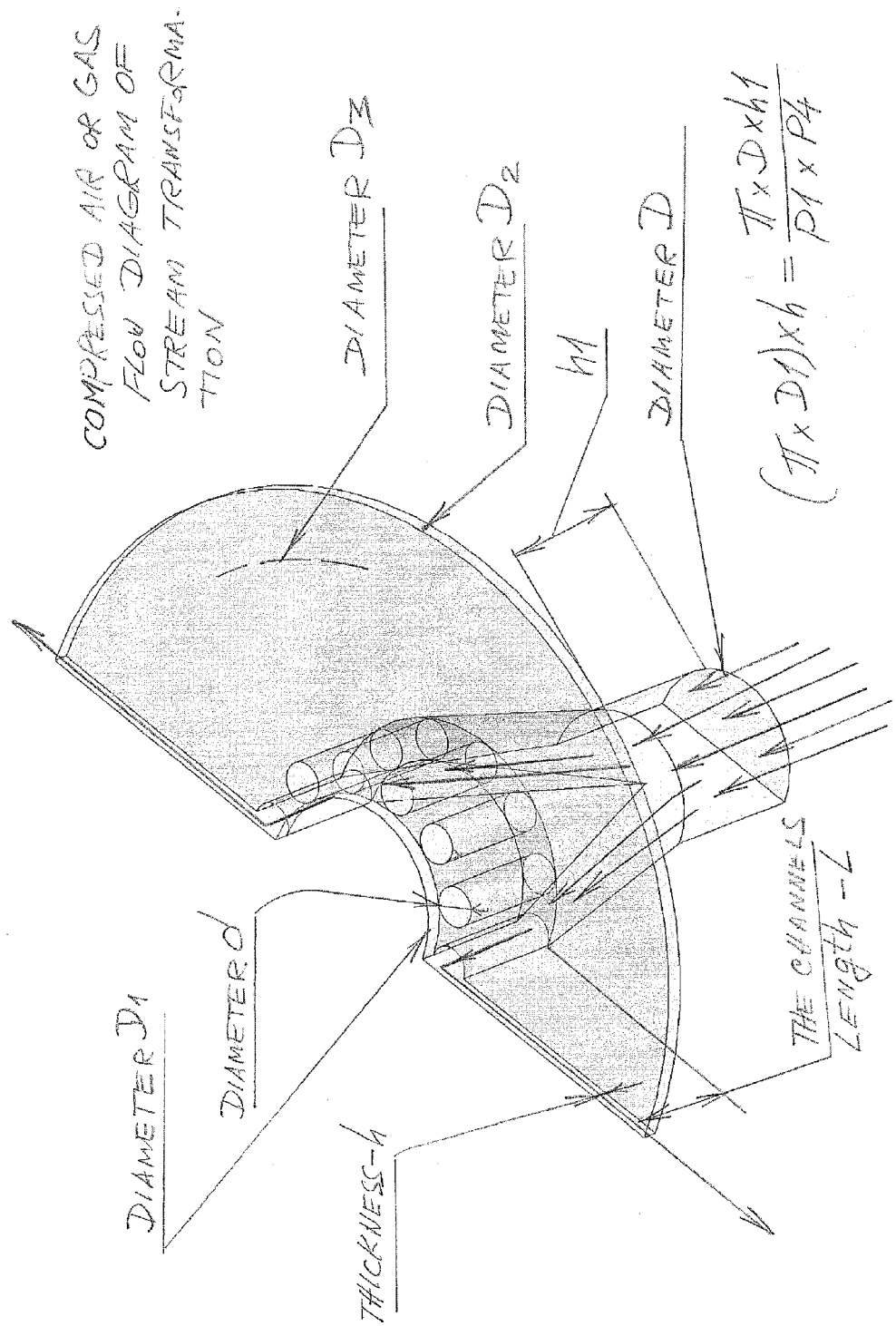
FIG. 21 is a diagram of compressed gas stream transformation in a foam generator.

In FIG. 21, a model of a stream of gas in the generator of foam is shown. Geometric parameters of components of a stream of gas and character transformation of their geometric dependencies are shown. The formula of equality of volumes of gas on an input in the generator and on an output from the generator is also shown.

Figure 22:
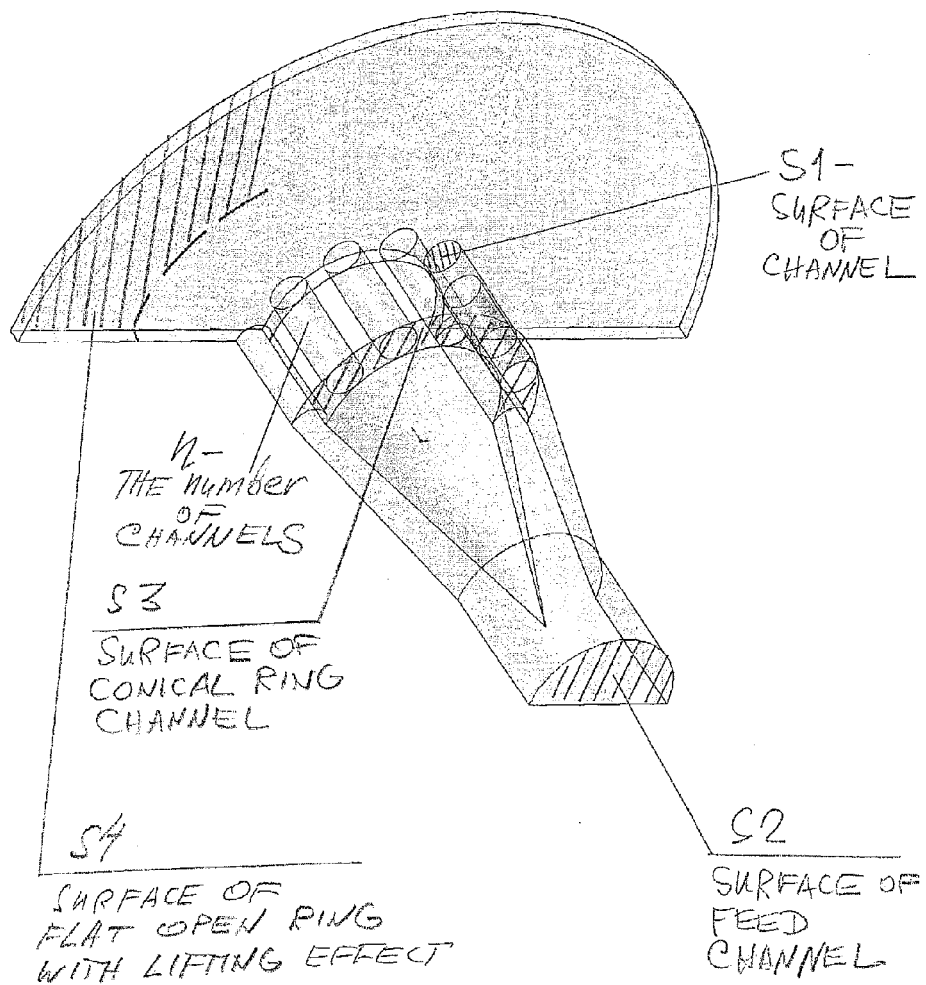
FIG. 22 is a diagram of compressed air or gas cross sections of the flow in the foam generator change from the input to the output.

In FIG. 22, a model of a stream of gas in the generator of foam with an indication on an active working area that forms an elevating effect of the generator is presented. Formulas for definition of the area of an active working surface of the generator are shown.

Figure 23:
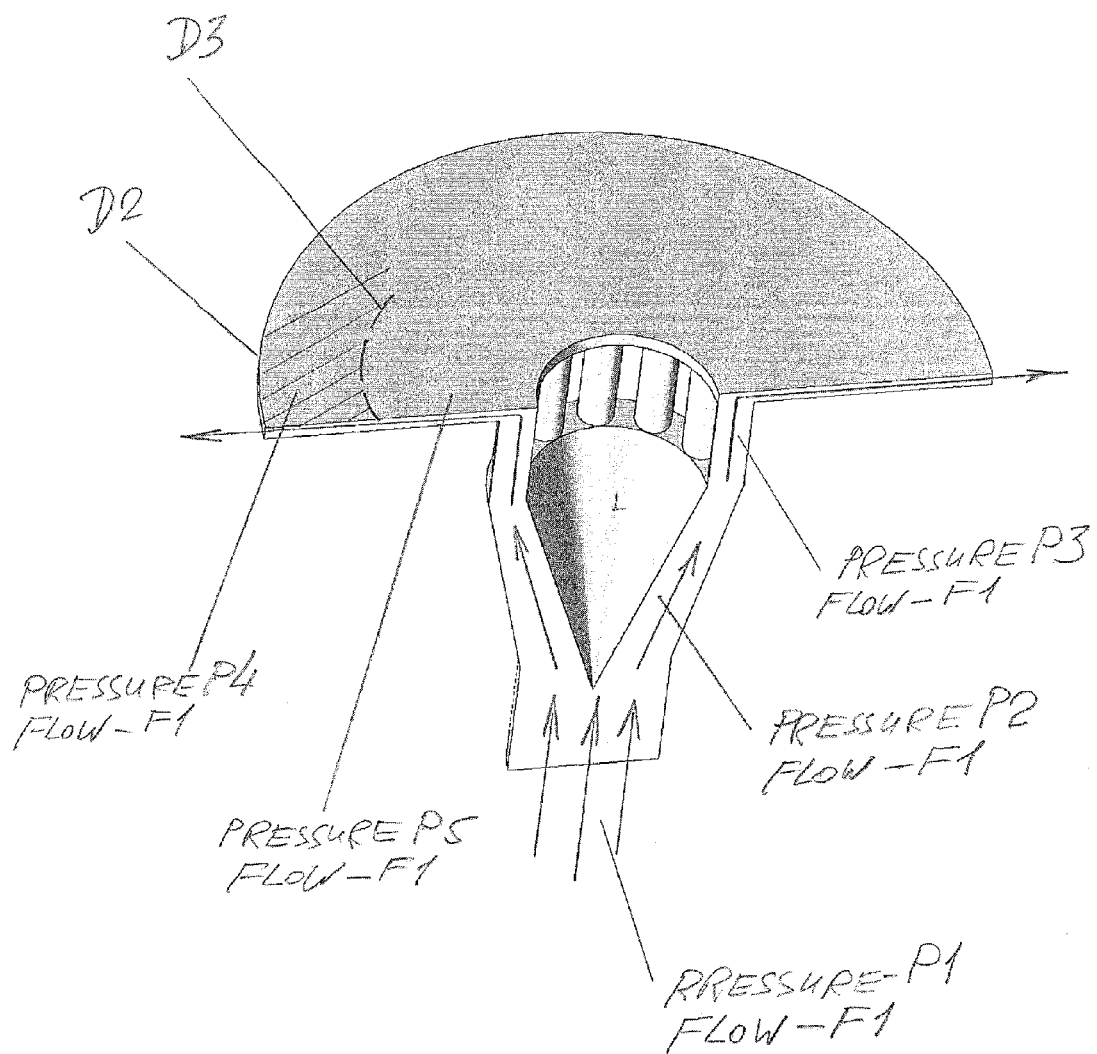
FIG. 23 is a diagram of pressure in the flow of gas in the foam generator change from input to output.

In FIG. 23, a diagram of pressure in a stream of gas that moves in the generator of foam is shown.

Figure 24:
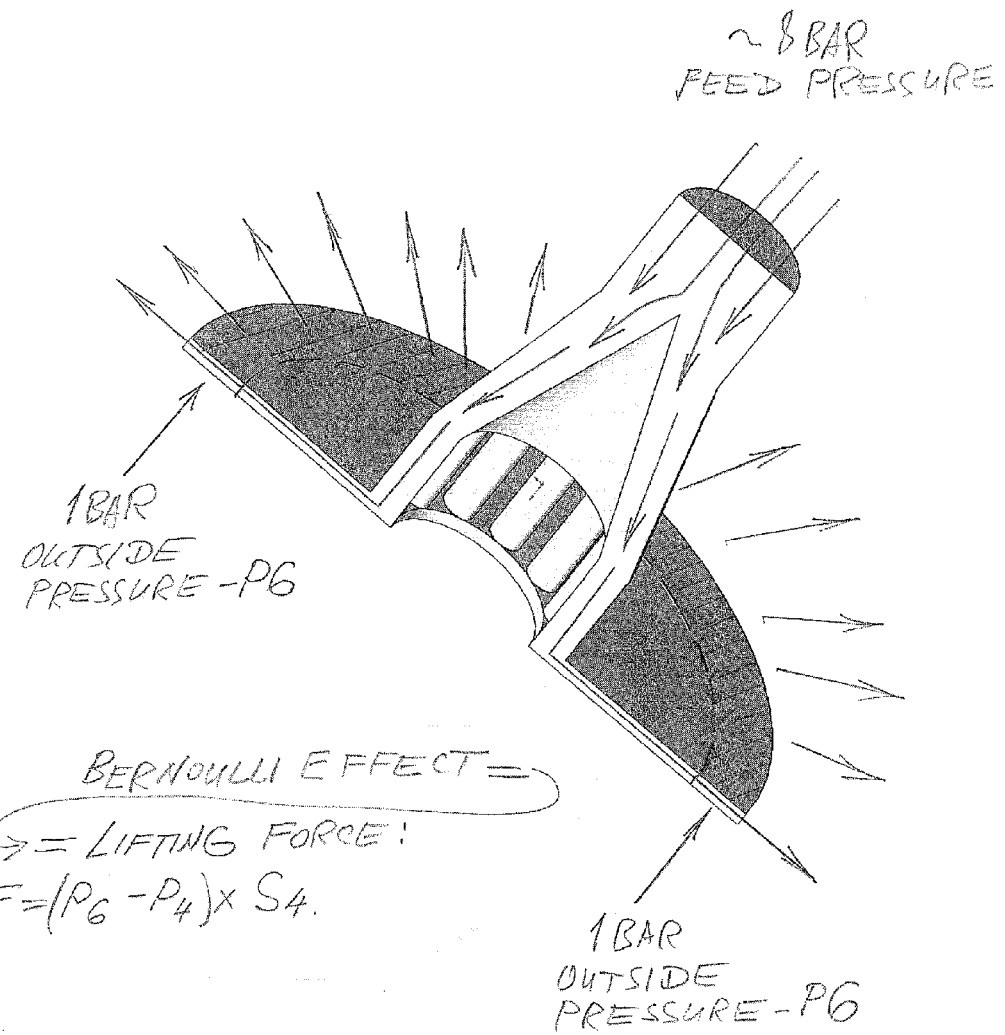
FIG. 24 is a diagram of the Bernoulli effect lifting force in the foam generator.

In FIG. 24, dependencies on the basis of which the elevating effect developed by the generator of foam is calculated are shown, and levels of pressure in a stream of gas in various parts of the generator are shown. A formula for the definition of elevating effect and the elevating effect developed by the generator of foam is shown.

Figure 25:
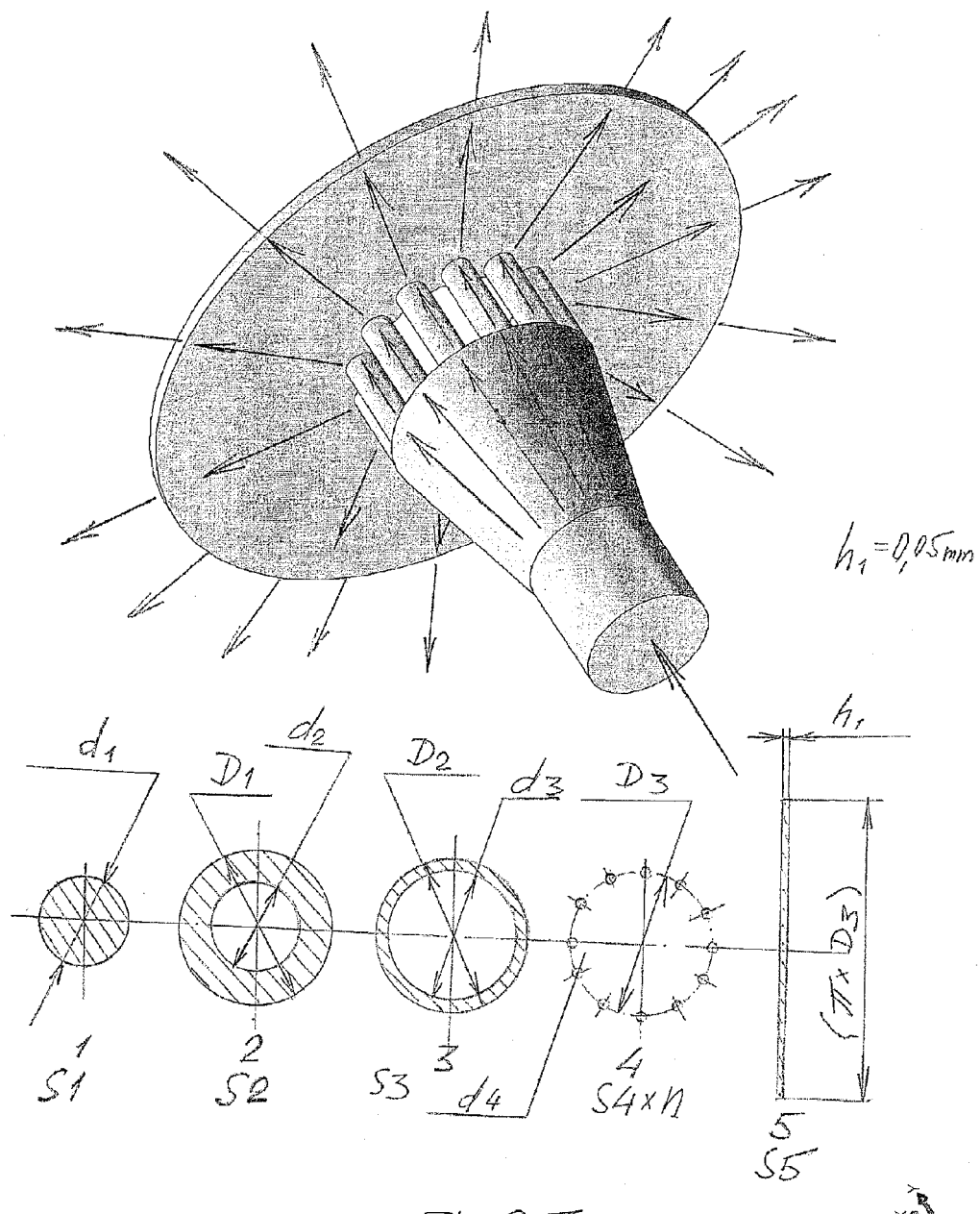
FIG. 25 is a diagram of the turbulent flow of compressed air characteristics in the foam generator and a diagram of cross sections of air flow in the foam generator.

In FIG. 25, a consecutive process of transformation of the form of a stream gas in the generator of foam is shown.

In FIG. 26, basic dependencies and formulas for a definition of a level of turbulence in various parts of a stream of gas in the generator of foam are shown.

Figure 27:
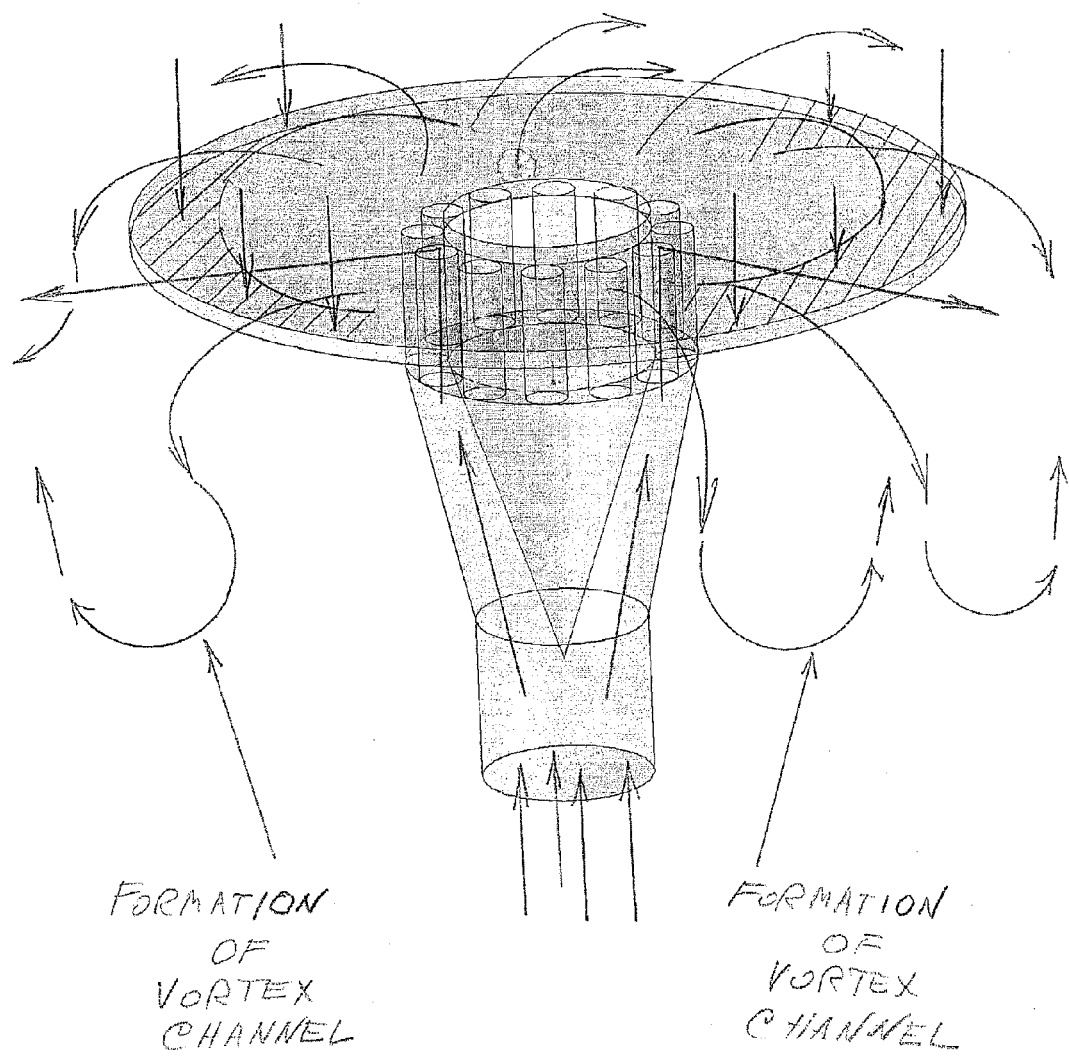
FIG. 27 is a diagram of vortex channels forming in the foam generator.

In FIGS. 27 and 28, processes of formation of the vortical phenomena in the generator of foam are schematically shown.

In FIGS. 29 and 30, diagrams of distribution of a stream in the generator of foam that forms vortical processes in volume of a liquid are shown.

Processing of Oil/Water Mix

In one exemplary application, the foamer device can be used to separate water and oil. Oil recovery from petroleum processing of tar sand oil results in various polluting factors which are formed as a result of the use of steam to remove the oil from underground deposits. Some applications are called de-oiling of water for water recovery. Oil and water are also mixed together as a result of various industrial processes that result in waste water streams. The water can include various types of pollutants. The list below is meant to be exemplary and does not imply that all of the pollutants must be present in the waste water. In addition, other pollutants might additionally be present in the waste water. In some examples, the main polluting factors in the water used to remove oil from the ground are particles, so-called heavy oil, which become mixed in the water. The particles include some heavy and viscous particles referred to as the bitumen group. Due to the high viscosity and the developed surface of contact at these particles, spontaneous coagulation of these particles can be observed; the level of concentration of the specified pollution can exceed 2-5 gram per liter. The particles also include finer particles which are sometimes referred to as light oil. The light oil forms a mix with water various on a level of volumetric integration emulsions. The concentration of such particles can reach about 5-8 grams per liter. In addition, in the water there can be iron in various ionic forms and in the form of solid particles. The concentration of this kind of pollution can reach about 100 and more milligrams per liter. In the waste water there can be also an ammonium and other ammoniac connections at concentration within the limits of up to about 100 milligram on liter. In addition, there can be also micro-dispersed dirt of an inorganic origin having a concentration of approximately 50-75 milligram per liter. In water there can also be minerals, such as strontium, bromine, iodide, barium and others at concentration 7-9 milligram on liter. The water can also include phenols at concentrations of about 3-5 milligram per liter, and sulfur at a concentration of about 25-35 milligram per liter. Table 1 below shows an exemplary summary of pollutants that might be present in the waste water and their approximate concentrations.

TABLE 1

| Parameter or material or contamination | Concentration |
| --- | --- |
| TSS | ~5-7 gram/liters |
| TDS | ~2-3 gram/liters |
| COD | ~500-550 mg/liters |
| BOD | ~120-220 mg/liter |
| OIL | ~5-7 gram/liter |
| Fe | ~50-70 mg/liter |
| Phenol | ~5-10 mg/liter |
| Ammonium | ~80-110 mg/liter |
| Boron | ~5-8 mg/liter |
| Bromine | ~5-8 mg/liter |
| Barium | ~5-8 mg/liter |

In order to dump or dispose of waste water, environmental restrictions on the level of contaminants included in the waste can be imposed. For example, water dumped in the water drain is often required to meet safety and ecological cleanliness levels. Exemplary levels of these requirements are presented in Table 2:

TABLE 2

| Parameter or material or contamination | Concentration |
| --- | --- |
| TSS | ~5-7 mg/liters |
| TDS | ~2-3 mg/liters |
| COD | ~5-8 mg/liters |
| BOD | ~10-12 mg/liter |
| OIL | ~5-7 mg/liter |
| Fe | ~50-70 mg/liter Not limited, but to prevent chemical complexes formation, the recommended concentration is about 5 mg/liter |
| Phenol | ~1-1.5 mg/liter |
| Ammonium | ~1-3 mg/liter |
| Boron | ~0.5 mg/liter |
| Bromine | ~0.5 mg/liter |
| Barium | ~1 mg/liter |

In some applications, the requirements for the recycled water intended for a reuse can be more stringent than the requirements for disposal. Exemplary requirements are presented in Table 3 below.

TABLE 3

| Parameter or material or contamination | Concentration |
| --- | --- |
| TSS | ~1 mg/liters |
| TDS | ~1 mg/liters |
| COD | ~1-3 mg/liters |
| BOD | ~1 mg/liter |
| OIL | ~0.5 mg/liter |
| Fe | ~1 mg/liter |
| Phenol | ~0.3 mg/liter |
| Ammonium | ~1 mg/liter |
| Boron | ~0.1 mg/liter |
| Bromine | ~1 mg/liter |
| Barium | ~1 mg/liter |

In some embodiments, in order to process sewage (e.g., waste water from oil processing), a first stage of processing of the sewage is performed using aerodynamic generators (e.g., as described herein). In the first stage, polluted water is submitted to a cylindrical holding tank through one or more inlets regularly distributed about near the bottom of the tank. The waste water is submitted at a level below a set of foam generators which are included in the tank. The foam generators are similar to the foam generators described herein and are based, at least in part, on the aerodynamic effect of high-speed streams of compressed air. After submission of the polluted water into the tank, the water level gradually increases to an overflow level. Compressed air is provided to the foam generators at a pressure of about 8 atmospheres. The foam generators produce from the waste water foam which rises to a top part of the tank. The foam grasps with itself particles of all types of pollution. The foam (and the collected pollution) is extracted through a foam collector and water is extracted from the tank via an outlet near the top of the tank. In general, the speed of the rising water in cylindrical capacity does not exceed 1-2 millimeters a second. In some embodiments, the height of the tank can be about 4 meters such that it takes approximately 45 minutes for the water to rise from the inlet at the bottom to the outlet at the top of the tank. It is believed that after processing, the foaming can remove 99.99% of solid contaminants. For example, when waste water with an initial concentration in 7 gram per liter (that is chemically not connected) is processed, the foaming can remove contaminants such that 0.9-1 milligram of residual pollution remains in the water. In cases in which the contaminants in the water are also chemically connected pollution, the removal rate of the contaminants can be lower, for example between 50-65%. As such, if the waste water has a high initial concentration of these contaminants, e.g., more than 9 milligram per liter, a second stage of processing can be used to further reduce the amount of contaminants that remain in the water.

An exemplary second stage of processing of the sewage can include the use of mechanical and ion-exchange filters loaded with natural zeolite. The second stage of processing can use mechanical combined filters in which as a filtering material is a natural ion-exchange a material such as zeolite. The zeolite can be in a granulated form with the size of a granule from about 0.6 to 1 millimeter. The zeolite is placed in capsules from a synthetic fabric on the basis of polymeric pitch. The capsules can have a volume of about 7-8 liters. The capsules with zeolite are placed in filtering modules, each of which is a segment of a column. Water passes through columns and undergoes an ionic exchange process at which of water ions of metals and such materials as ammonium are extracted from the water. Such method of cleaning can reduce the contaminants to a level not above 1-3 milligrams per liter.

As described in the two stage process above, a modular principle can be used for the process equipment used in the first and second stages of processing of the specified type of sewage. For maintenance of flexibility, decrease in expenses for service and the maintenance of the equipment, its performance in the form of technological advances, a modular approach allows replacement of the equipment on a module-by-module basis.

Due to the increase of flexibility and efficiency due to the modular nature of the equipment, the equipment and processing can be performed locally. For example, the process equipment can be installed directly in those points of process where there is a pollution of water. In addition, in such points if there are only certain polluting factors present and not others, the modular implementation allows only the needed process equipment and processing to be performed. This can reduce the cost of installing and running the equipment and increase the efficiency of the process. In such cases, absence of pollution of other type which is distinct from pollution, inherent in the specified local site of technological process, allows a reuse of the cleared water even if concentration of pollution exceed the concentration resolved by the standard for dump in the water drain.

Other embodiments are within the scope of the following claims.

What is claimed is:

1. A device for removing contaminants from a liquid, the device comprising:
    at least one holding cavity configured to hold a liquid;
    at least one foaming mechanism configured to receive a plurality of streams of pressurized gas and generate a foamed liquid from the liquid in the holding cavity; and
    at least one removal cavity disposed within the holding cavity configured to collect and remove at least some of the foamed liquid and a contaminant included in the foamed liquid from the holding cavity, wherein the mechanism comprises:
    an aerodynamic component; an aerodynamic housing disposed around at least a portion of the aerodynamic component, the aerodynamic housing including a plurality of first channels; and a plurality of second channels connected to the plurality of first channels at regular intervals on a distributed plane, the distributed plane being about perpendicular to the plurality of first channels, wherein the plurality of first channels and the plurality of second channels are configured to transform an axial stream of a gaseous working agent into a plurality of radial high-speed streams of the gaseous working agent by channeling the gaseous working agent through the plurality of first channels and into the plurality of second channels on the distributed plane; and a hydrodynamic conical reflector and a hydrodynamic housing forming a ring channel in an area between the hydrodynamic conical reflector and the hydrodynamic housing; and an accumulation mechanism configured to disperse the plurality of radial highspeed streams of the gaseous working agent into the ring channel and create turbulence to foam the liquid.

2. The device of claim 1, wherein the accumulation mechanism is configured to create turbulence to foam the liquid utilizing at least the physical principles of Bernoulli's theorem.

* * * * *